(12) United States Patent
Wang et al.

(10) Patent No.: US 12,130,669 B2
(45) Date of Patent: Oct. 29, 2024

(54) SUPPORT PLATE AND FOLDABLE DISPLAY

(71) Applicant: BOE TECHNOLOGY GROUP CO., LTD., Beijing (CN)

(72) Inventors: Haoran Wang, Beijing (CN); Fangxu Cao, Beijing (CN); Liming Dong, Beijing (CN); Paoming Tsai, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 481 days.

(21) Appl. No.: 17/419,222

(22) PCT Filed: Jan. 20, 2021

(86) PCT No.: PCT/CN2021/072866
§ 371 (c)(1),
(2) Date: Jun. 28, 2021

(87) PCT Pub. No.: WO2021/147896
PCT Pub. Date: Jul. 29, 2021

(65) Prior Publication Data
US 2022/0147107 A1    May 12, 2022

(30) Foreign Application Priority Data

Jan. 21, 2020   (CN) .......................... 202020141702.2
Apr. 4, 2020    (CN) .......................... 202020486804.8

(51) Int. Cl.
*G06F 1/16*   (2006.01)

(52) U.S. Cl.
CPC .......... *G06F 1/1656* (2013.01); *G06F 1/1616* (2013.01); *G06F 1/1652* (2013.01)

(58) Field of Classification Search
CPC ...... G02F 1/133; G06F 1/1616; G06F 1/1652; G06F 1/1656; H09F 9/301
See application file for complete search history.

(56) References Cited

U.S. PATENT DOCUMENTS 9,983,424 B2 *   5/2018   Kim ...................... H10K 77/111
10,074,824 B2 *  9/2018   Han ...................... G06F 1/1652
(Continued)

FOREIGN PATENT DOCUMENTS

CN    207008995 U    2/2018
CN    208141720 U    11/2018
(Continued)

OTHER PUBLICATIONS

Ferron, 2017 Smartphone Comparison Guide, May 8, 2017, New Atlas, https://newatlas.com/best-smartphones-specs-features-comparison-2017/49418/ (Year: 2017).*
(Continued)

*Primary Examiner* — Rockshana D Chowdhury
*Assistant Examiner* — Martin Antonio Asmat Uceda
(74) *Attorney, Agent, or Firm* — IP & T GROUP LLP

(57) ABSTRACT

A support plate includes a support plate body and a plurality of through holes. The support plate body has at least one patterned region. The plurality of through holes are disposed in the at least one patterned region, and penetrate through the support plate body in a thickness direction of the support plate body. A projection of each through hole on a first plane perpendicular to the thickness direction of the support plate body is strip-shaped.

13 Claims, 11 Drawing Sheets

(56) References Cited

U.S. PATENT DOCUMENTS

| | | | |
|---|---|---|---|
| 10,334,750 B2* | 6/2019 | Koo | H04M 1/0268 |
| 10,490,771 B2* | 11/2019 | Kim | H10K 50/8423 |
| 10,798,831 B2* | 10/2020 | Shin | H05K 5/0217 |
| 11,176,851 B2* | 11/2021 | Wang | H10K 50/8426 |
| 2007/0216834 A1 | 9/2007 | Hsu et al. | |
| 2016/0357052 A1* | 12/2016 | Kim | G02F 1/133308 |
| 2019/0132987 A1* | 5/2019 | Koo | H05K 7/18 |
| 2020/0273379 A1 | 8/2020 | Wang et al. | |

FOREIGN PATENT DOCUMENTS

| | | |
|---|---|---|
| CN | 109360499 A | 2/2019 |
| CN | 210627726 U | 5/2020 |
| CN | 211742521 U | 10/2020 |

OTHER PUBLICATIONS

Extended European Search Report issued by the EPO for Application No. 21733701.3 dated Jun. 6, 2023.

\* cited by examiner

A1-A1'

A1-A1'

B1-B1'

SUPPORT PLATE AND FOLDABLE DISPLAY

CROSS-REFERENCE TO RELATED APPLICATIONS

This application is a national phase entry under 35 USC 371 of International Patent Application No. PCT/CN2021/072866, filed on Jan. 20, 2021, which claims priority to Chinese Patent Application No. 202020141702.2, filed on Jan. 21, 2020, and Chinese Patent Application No. 202020486804.8, filed on Apr. 4, 2020, which are incorporated herein by reference in their entirety.

TECHNICAL FIELD

The present disclosure relates to the field of display technologies, and in particular, to a support plate and a foldable display.

BACKGROUND

With the rapid development of display technologies, various types of displays are gradually entering the market in order to meet different user needs. The flexible display technology has opened up a brand-new direction of application form for the design of future mobile terminals. Since a flexible display itself has characteristics of lightness and thinness and high flexibility, different application forms such as folding and curling may be realized.

Among the flexible displays, a foldable display has become a current research and development hotspot of displays due to its advantages such as convenient portability and small volume.

SUMMARY

In an aspect, a support plate is provided, and the support plate includes a support plate body and a plurality of through holes. The support plate body has at least one patterned region. The plurality of through holes are disposed in the at least one patterned region, and penetrate through the support plate body in a thickness direction of the support plate body. A projection of each through hole on a first plane perpendicular to the thickness direction of the support plate body is strip-shaped.

In some embodiments, each of the plurality of through holes extends in a first direction on the first plane.

In some embodiments, a projection of at least one of the plurality of through holes on the first plane is in a rectangular shape.

In some embodiments, a projection of at least one of the plurality of through holes on the first plane is in a rectangular shape with rounded corners.

In some embodiments, a projection of at least one of the plurality of through holes on the first plane is in a closed shape composed of two straight line portions and two curved line portions. The two straight line portions extend in a first direction, each end of one straight line portion is aligned with one end of another straight line portion in a second direction. The second direction is perpendicular to the first direction on the first plane. Each curved line portion is connected to respective ends of the two straight portions that are aligned with each other.

In some embodiments, each curved line portion is a semicircle.

In some embodiments, the plurality of through holes are arranged in a plurality of columns of through holes in a second direction, and any two adjacent columns of through holes are spaced apart. Each column of through holes includes at least one through hole arranged in the first direction. The second direction is perpendicular to the first direction on the first plane.

In some embodiments, each column of through holes includes through holes arranged in the first direction. In any two adjacent columns of the plurality of columns of through holes, in addition to two through holes at two ends of one column of through holes, a projection of any through hole of the one column of through holes on a second plane perpendicular to the second direction is overlapped with projections of two adjacent through holes in another column of through holes on the second plane perpendicular to the second direction. A projection of each of the two through holes at the two ends on the second plane perpendicular to the second direction is overlapped with projection(s) of one or two adjacent through holes in another column of through holes on the second plane perpendicular to the second direction.

In some embodiments, a projection of a portion between any two through holes in the one column of through holes on the second plane is located in a middle of a projection of one through hole in the another column of through holes on the second plane.

In some embodiments, a maximum value $A_{max}$ of lengths of the plurality of through holes in the first direction, a minimum value $C_{min}$ of first distances each between any through hole in a column of through holes and any through hole in an adjacent column of through holes in the second direction, and a bending radius R of the support plate body bending along a bending line parallel to the first direction in the at least one patterned region satisfy a formula:

$$\frac{10^6 \times C_{min}^3}{R \times A_{max}^3} \leq 30.$$

A length of each through hole in the first direction is a maximum length of the through hole in the first direction, and the maximum value $A_{max}$ is a maximum value of a plurality of maximum lengths. A first distance between any through hole in a column of through holes and any through hole in an adjacent column of through holes in the second direction is a minimum first distance of the two through holes in the second direction, and the minimum value $C_{min}$ is a minimum value of a plurality of minimum first distances. Units of the maximum value $A_{max}$, the minimum value $C_{min}$ and the bending radius R are the same.

In some embodiments, the minimum value $C_{min}$ and a thickness t of the support plate body satisfy a condition that t: $C_{min}$=1~4.

In some embodiments, a maximum value $D_{max}$ of widths of the plurality of through holes in the second direction and the minimum value $C_{min}$ satisfy a condition that $D_{max}$: $C_{min}$=1~5. A width of each through hole in the second direction is a maximum width of the through hole in the second direction, and the maximum value $D_{max}$ is a maximum value of a plurality of maximum widths.

In some embodiments, a minimum value $B_{min}$ of second distances each between every two adjacent through holes in a same column of through holes in the first direction and the minimum value $C_{min}$ satisfy a condition that $B_{min}$: $C_{min}$=0.5~4. A second distance between every two adjacent through holes in the first direction is a minimum second distance of the two through holes in the first direction, and the minimum value $B_{min}$ is a minimum value of a plurality of minimum second distances.

In some embodiments, the maximum value $A_{max}$ and the minimum value $B_{min}$ satisfy a condition that $A_{max}$:$B_{max}$=10~100.

In some embodiments, first distances each between any through hole in a column of through holes and any through hole in an adjacent column of through holes in the second direction are equal.

In some embodiments, a shape of the projection of each of the plurality of through holes on the first plane is the same, and an area of the projection is equal.

In some embodiments, the maximum length of each through hole in the first direction is within a range of 1 mm to 50 mm, and a thickness t of the support plate body is within a range of 0.01 mm to 0.5 mm.

In a second aspect, a foldable display is provided, and the foldable display includes a flexible display panel and the support plate in any one of the above embodiments. The flexible display panel has a bending display portion. The support plate is disposed on a side of the flexible display panel opposite to a light exit side of the flexible display panel. An orthogonal projection of the bending display portion of the flexible display panel on the first plane is overlapped with an orthogonal projection of each of the at least one patterned region on the first plane.

In some embodiments, the at least one patterned region includes one patterned region, and the orthogonal projection of the bending display portion of the flexible display panel on the first plane is located in the orthogonal projection of the patterned region on the first plane.

In some embodiments, each of the plurality of through holes extends in a first direction on the first plane, and the bending display portion of the flexible display panel is bent along a bending line parallel to the first direction.

BRIEF DESCRIPTION OF THE DRAWINGS

In order to describe technical solutions in the present disclosure more clearly, the accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, but are not limitations on actual sizes of products, actual processes of methods and actual timings of signals involved in the embodiments of the present disclosure.

DETAILED DESCRIPTION

Figure 1:
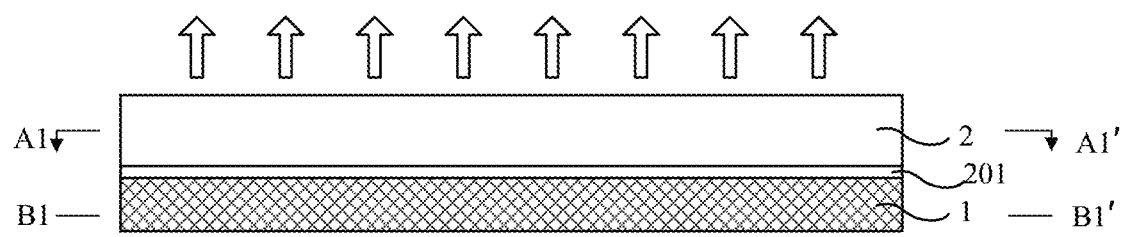
FIG. 1 is a schematic structural diagram of a foldable display, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art on a basis of the embodiments of the present disclosure shall be included in the protection scope of the present disclosure.

As used herein, the singular form "a/an" also includes the plural form, unless the context clearly dictates otherwise. Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "an example", and "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, terms such as "first" and "second" are used for descriptive purposes to only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

The term "a/the same layer" means that a film for forming specific patterns is formed by using a same film-forming process, and then is patterned by a patterning process using a same mask to form a layer structure. The patterning process may include exposure, development and etching processes, and the specific patterns in the formed layer structure may be continuous or discontinuous, and these specific patterns may also be at different heights or have different thicknesses.

In the description of some embodiments, the term "connected" and its derivatives may be used. For example, the term "connected" may be used in the description of some embodiments to indicate that two or more components are in direct physical contact or electrical contact with each other. However, terms such as "connected" may also mean that two or more components are not in direct contact with each other, but still cooperate or interact with each other. The embodiments disclosed herein are not necessarily limited to the content herein.

It will be understood that, when a layer or an element is referred to as being on another layer or a substrate, it may be directly on another layer or the substrate, or intermediate layer(s) may also be present.

The use of "applicable to" or "configured to" herein means an open and inclusive expression, which does not exclude devices that are applicable to or configured to perform additional tasks or steps.

In addition, the use of "based on" is meant to be open and inclusive, since a process, step, calculation or other actions that is "based on" one or more of the stated conditions or values may, in practice, be based on additional conditions or values other than those stated.

The term such as "about" or "approximately" as used herein includes a stated value and an average value within an acceptable range of deviation of a particular value. The acceptable range of deviation is determined by a person of ordinary skill in the art in view of measurement in question and errors associated with a particular amount of measurement (i.e., the limitations of the measurement system).

Exemplary embodiments are described herein with reference to sectional views and/or plan views as idealized exemplary drawings. In the accompanying drawings, thicknesses of layers and sizes of regions are enlarged for clarity. Exemplary embodiments of the present disclosure should not be construed to be limited to the shapes of regions shown herein, but include deviations in shapes due to, for example, manufacturing. For example, an etched area shown in a rectangular shape generally has a curved feature. Therefore, regions shown in the accompanying drawings are schematic in nature, and their shapes are not intended to show actual shapes of the regions in a device, and are not intended to limit the scope of the exemplary embodiments.

Some embodiments of the present disclosure provide a foldable display. The foldable display may be used as any product or component with a display function, such as a television, a mobile phone, a tablet computer, a notebook computer, a digital photo frame or a navigator, and the use of the foldable display is not specifically limited in the embodiments of the present disclosure.

In some embodiments, the foldable display is a liquid crystal display (LCD).

In some other embodiments, the foldable display is an electroluminescent display or any other type of display.

In some examples, the electroluminescent display is an organic electroluminescent display (also called organic light-emitting diode display), a quantum dot electroluminescent display (also called quantum dot light-emitting diode display), or a micro light-emitting diode (Micro LED) display.

In some embodiments, as shown in FIG. 1, the foldable display includes a flexible display panel 2 and a support plate 1 disposed on a side of the flexible display panel 2 opposite to a light exit side of the flexible display panel 2.

In some examples, the flexible display panel 2 and the support plate 1 are fixed together through an adhesive. That is, as shown in FIG. 1, an adhesive layer 201 is provided between the flexible display panel 2 and the support plate 1.

For example, the adhesive layer 201 is made of thermosetting resin or photocurable resin.

In some other examples, the flexible display panel 2 and the support plate 1 are fixed together through fixing member(s), such as fastener(s).

Of course, the flexible display panel 2 and the support plate 1 may also be fixed together through any other structure, and a manner in which the flexible display panel 2 and the support plate 1 are fixed is not specifically limited in the embodiments of the present disclosure.

In some embodiments, other structures such as a backlight module may further be provided between the flexible display panel 2 and the support plate 1, which is not limited in the embodiments of the present disclosure.

Figure 2:
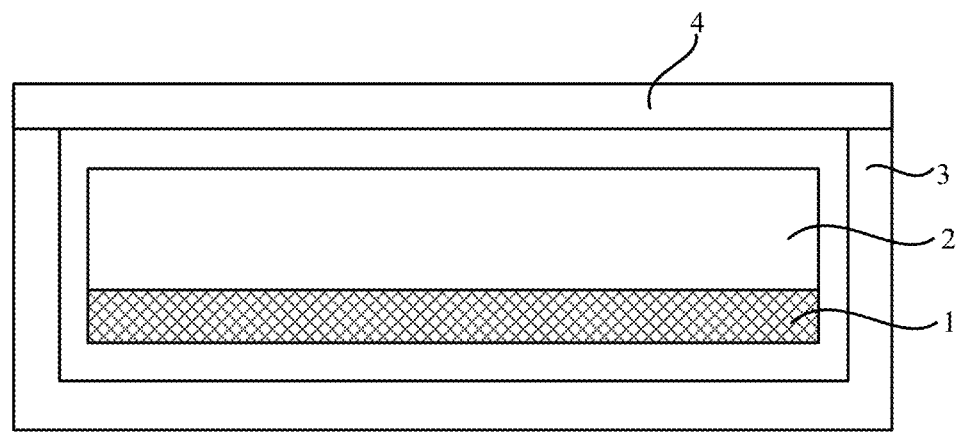
FIG. 2 is a schematic structural diagram of another foldable display, in accordance with some embodiments.

In some other embodiments, as shown in FIG. 2, the foldable display further includes a frame 3, a cover plate 4 and other electronic accessories, etc. Of course, the foldable display may further include more or fewer components, and relative positions of these components may be changed.

For example, a longitudinal section of the frame 3 is U-shaped, and the flexible display panel 2, the support plate 1 and other electronic accessories are all disposed in the frame 3. The cover plate 4 is disposed at a side of the flexible display panel 2 away from the support plate 1.

In yet other embodiments, the foldable display is the liquid crystal display, and the foldable display further includes a backlight module. The backlight module is configured to provide a light source for the flexible display panel 2. The backlight module is disposed between the flexible display panel 2 and the support plate 1.

In addition, a structure of the flexible display panel 2 is not limited in the embodiments of the present disclosure. For example, in a case where the foldable display is the electroluminescent display, the flexible display panel 2 is an electroluminescent display panel. In a case where the foldable display is the liquid crystal display, the flexible display panel 2 is a liquid crystal display panel. For convenience of understanding the embodiments of the present disclosure, the structure of the flexible display panel 2 will be exemplarily introduced below in an example where the flexible display panel 2 is the liquid crystal display panel and in an example where the flexible display panel 2 is the electroluminescent display panel. However, the exemplary introduction below is not to be construed as limitations on the structure of the flexible display panel 2 provided in the embodiments of the present disclosure, and other variations are possible in the structure of the flexible display panel 2 in the embodiments of the present disclosure.

Figure 3:
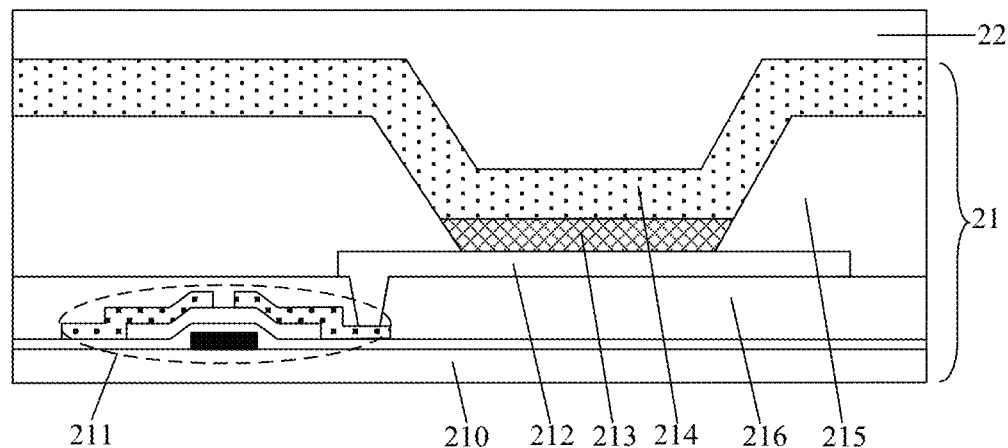
FIG. 3 is a cross-sectional view of a flexible display panel in FIG. 1 taken along the A1-A1 direction, in accordance with some embodiments.

In some embodiments, the foldable display is the electroluminescent display, and the flexible display panel 2 is the electroluminescent display panel. As shown in FIG. 3, the electroluminescent display panel includes a display substrate 21 and an encapsulation layer 22 for encapsulating the display substrate 21.

In some examples, the encapsulation layer 22 is an encapsulation film.

In some other examples, the encapsulation layer 22 is an encapsulation substrate.

In some examples, the electroluminescent display panel has a plurality of sub-pixel regions. As shown in FIG. 3, the display substrate 21 includes a first base 210, and a plurality of light-emitting devices and a plurality of pixel driving circuits disposed on the first base 210. Each pixel driving circuit corresponds to one light-emitting device, and the two are disposed in one sub-pixel region. Each pixel driving circuit includes a plurality of thin film transistors 211. Each thin film transistor 211 includes an active layer, a source, a drain, a gate and a gate insulating layer, and the source and the drain are in contact with the active layer. Each light-emitting device includes an anode 212, a light-emitting functional layer 213 and a cathode 214. The anode 212 of each light-emitting device is electrically connected to the drain of the thin film transistor 211 as a driving transistor among the plurality of thin film transistors 211 of a corresponding pixel driving circuit.

For example, the light-emitting functional layer 213 only includes a light-emitting layer. For another example, in addition to the light-emitting layer, the light-emitting functional layer 213 further includes one or more of an electron transport layer (ETL), an electron injection layer (EIL), a hole transport layer (HTL) and a hole injection layer (HIL).

In some other examples, the display substrate 21 further includes a pixel defining layer 215. The pixel defining layer 215 includes a plurality of openings, and one light-emitting device is disposed in one opening.

In yet other examples, as shown in FIG. 3, the display substrate 21 further includes a planarization layer 216 disposed between the pixel driving circuit and the anode 212 of the light-emitting device corresponding to the pixel driving circuit.

In some examples, the electroluminescent display panel is a top-emission display panel. In this case, the anode 212 of the light-emitting device proximate to the first base 210 is opaque, and the cathode 214 of the light-emitting device away from the first base 210 is transparent or translucent.

In some other examples, the electroluminescent display panel is a bottom-emission display panel. In this case, the anode 212 of the light-emitting device proximate to the first base 210 is transparent or translucent, and the cathode 214 of the light-emitting device away from the first base 210 is opaque.

In yet other examples, the electroluminescent display panel is a double-sided emission display panel. In this case, both the anode 212 proximate to the first base 210 and the cathode 214 away from the first base 210 of the light-emitting device are transparent or translucent.

Figure 4:
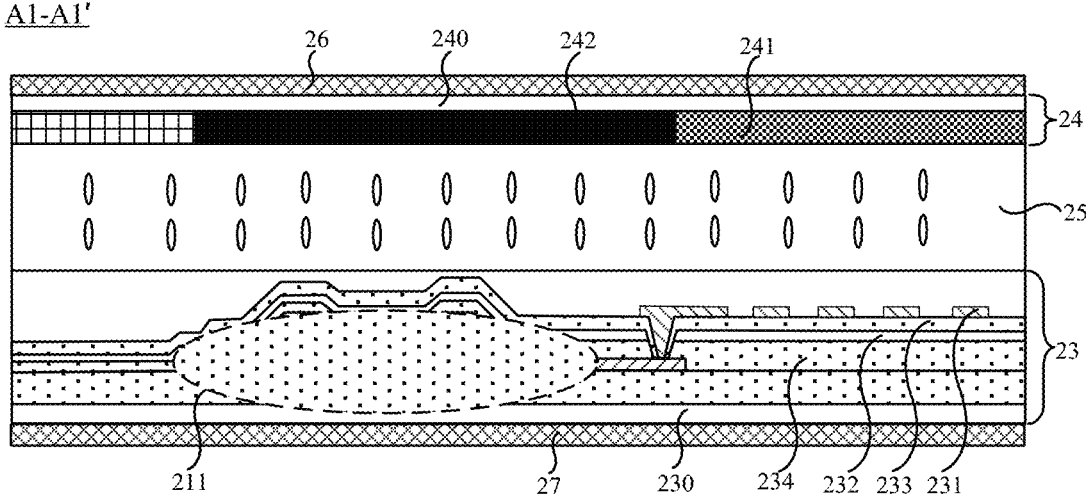
FIG. 4 is another cross-sectional view of a flexible display panel in FIG. 1 taken along the A1-A1' direction, in accordance with some embodiments.

In some other embodiments, the foldable display is the liquid crystal display, and the flexible display panel 2 is the liquid crystal display panel. As shown in FIG. 4, the liquid crystal display panel includes an array substrate 23 and an opposite substrate 24 that are arranged opposite to each other, and a liquid crystal layer 25 disposed between the array substrate 23 and the opposite substrate 24.

In some examples, the array substrate 23 includes a second base 230, and thin film transistors 211 and pixel electrodes 231 disposed on the second base 230. The pixel electrode 231 is electrically connected to a drain of the thin film transistor 211. The array substrate 23 has a plurality of sub-pixel regions. The thin film transistor 211 and a corresponding pixel electrode 231 are disposed in one sub-pixel region.

In some other examples, the array substrate 23 further includes common electrode(s) 232 disposed on the second base 230.

For example, the pixel electrode 231 and the common electrode 232 are arranged in a same layer. In this case, the pixel electrode 231 and the common electrode 232 are each of a comb structure including a plurality of strip-shaped sub-electrodes.

For another example, the pixel electrode 231 and the common electrode 232 are arranged in different layers. In this case, as shown in FIG. 4, a first insulating layer 233 is provided between the pixel electrode 231 and the common electrode 232. In a case where the common electrode 232 is disposed between the thin film transistor 211 and the pixel electrode 231, as shown in FIG. 4, a second insulating layer 234 is further provided between the common electrode 232 and the thin film transistor 211.

In some examples, as shown in FIG. 4, the opposite substrate 24 includes a color filter layer 241 disposed on a third base 240. In this case, the opposite substrate 24 may also be referred to as a color filter (CF) substrate. The color filter layer 241 includes at least red filter units, green filter units and blue filter units. The red filter units, the green filter units and the blue filter units are arranged opposite to the sub-pixel regions of the array substrate 23 in one-to-one correspondence. The opposite substrate 24 further includes a black matrix pattern 242 disposed on the third base 240. The black matrix pattern 242 is configured to space the red photoresist unit, the green photoresist unit and the blue photoresist unit.

In some examples, as shown in FIG. 4, the liquid crystal display panel further includes an upper polarizer 26 disposed on a side of the opposite substrate 24 away from the liquid crystal layer 25 and a lower polarizer 27 disposed on a side of the array substrate 23 away from the liquid crystal layer 25.

Figure 5:
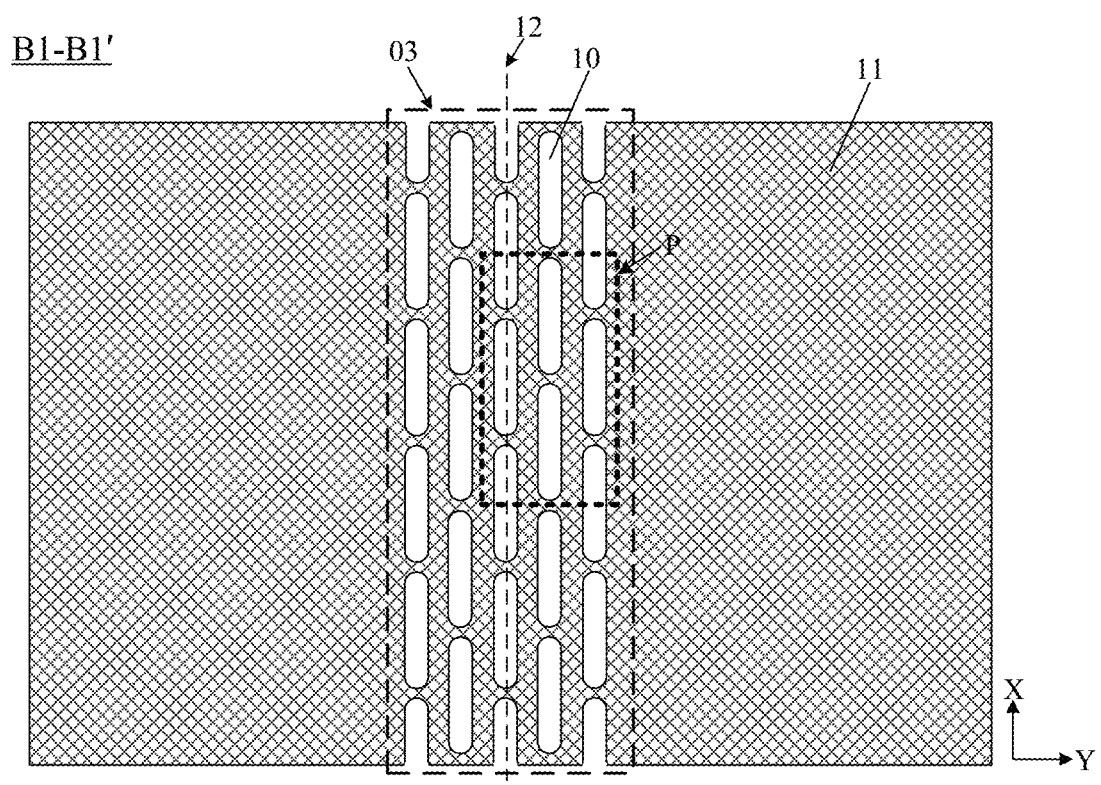
FIG. 5 is a cross-sectional view of a support plate in FIG. 1 taken along the B1-B1' direction, in accordance with some embodiments.
Figure 6A:
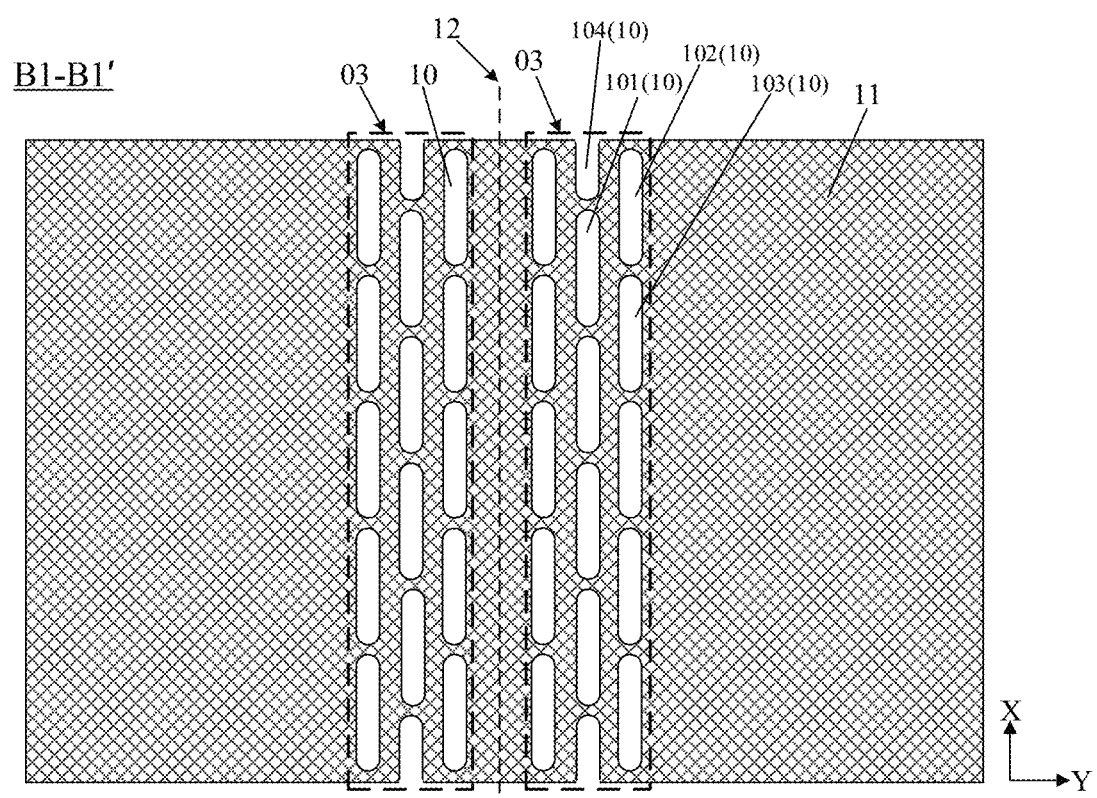
FIG. 6A is another cross-sectional view of a support plate in FIG. 1 taken along the B1-B1' direction, in accordance with some embodiments.
Figure 6B:
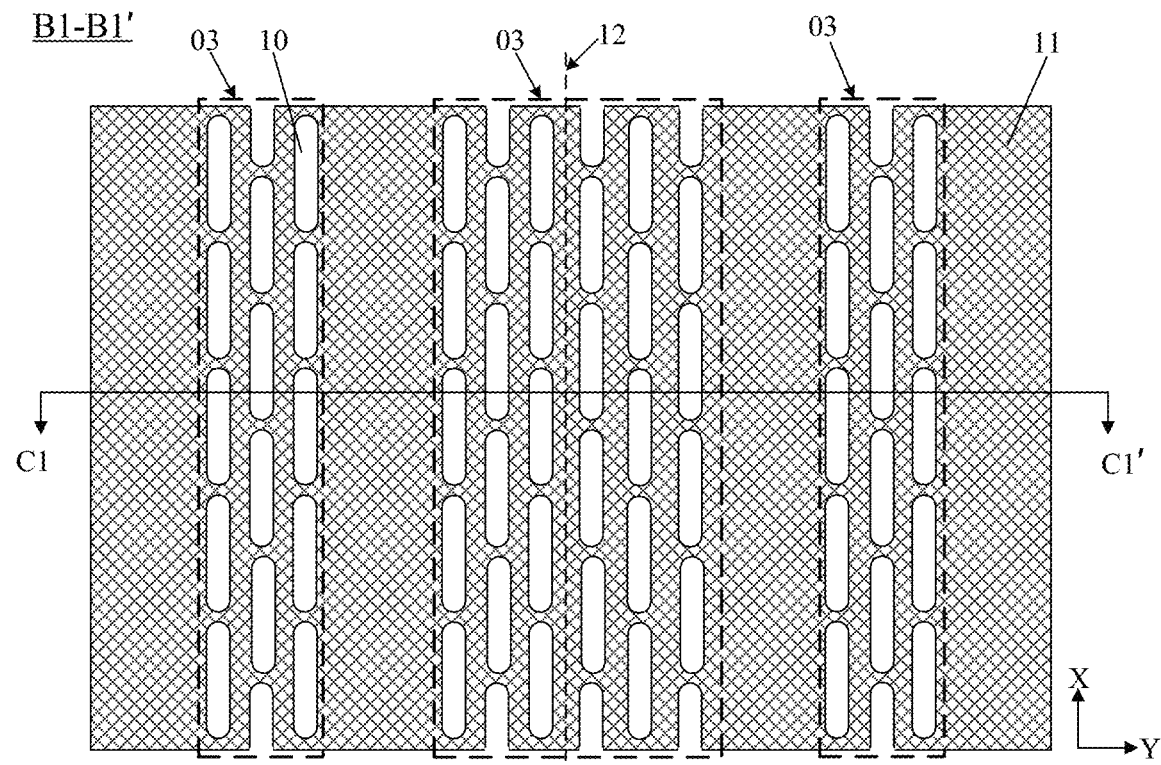
FIG. 6B is yet another cross-sectional view of a support plate in FIG. 1 taken along the B1-B1' direction, in accordance with some embodiments.

Some embodiments of the present disclosure provide the support plate 1, which may be applied in the foldable display as described above. As shown in FIGS. 5, 6A and 6B, the support plate 1 includes a support plate body 11 and a plurality of through holes 10. The support plate body 11 has at least one patterned region 03. The plurality of through holes 10 are disposed in the at least one patterned region 03, and penetrate through the support plate body 11 in a thickness direction of the support plate body 11.

In some examples, as shown in FIG. 5, the support plate body 11 has one patterned region 03. The plurality of through holes 10 are disposed in the one patterned region 03.

In some other examples, as shown in FIGS. 6A and 6B, the support plate body 11 has a plurality of patterned regions 03. The plurality of through holes 10 are disposed in the plurality of patterned regions 03. The number of through holes 10 in different patterned regions 03 is not exactly equal. Here, the phrase "not exactly equal" means that the number of through holes 10 in a part of the patterned regions is equal, and the number of through holes 10 in another part of the patterned regions is not equal, or the number of through holes 10 in each patterned region is not equal.

The number of the patterned regions 03 of the support plate body 11 and the number of through holes 10 in each patterned region 03 are not limited in the embodiments of the present disclosure, which may be set according to bending needs of the support plate. For example, the patterned region(s) are arranged at position(s) where a bending degree of the support plate is large, and the number of through holes 10 in the patterned region may be set according to a magnitude of bending stress that needs to be released in the patterned region during bending.

For example, as shown in FIG. 6A, the support plate body 11 has two patterned regions 03. The plurality of through holes 10 are disposed in the two patterned regions 03, and the number of through holes 10 in each patterned region 03 is equal.

Figure 6C:
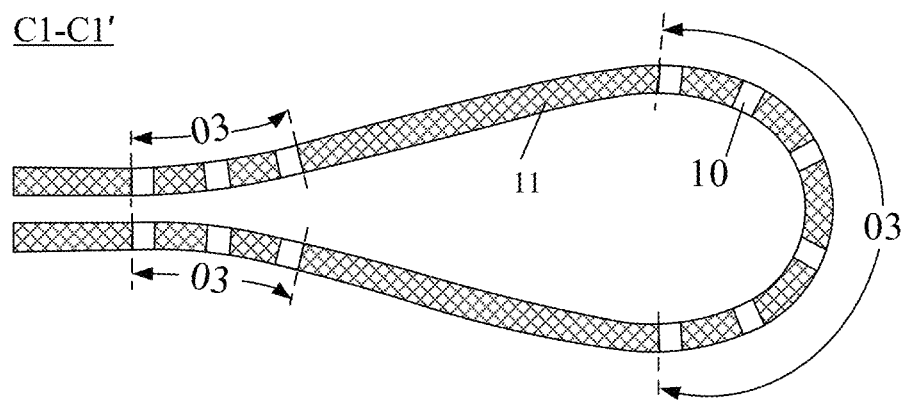
FIG. 6C is a cross-sectional view of the support plate in FIG. 6B after being folded and taken along the C1-C1' direction, in accordance with some embodiments.

For another example, as shown in FIG. 6B, the support plate body 11 has three patterned regions 03. The plurality of through holes 10 are disposed in the three patterned regions 03. The support plate shown in FIG. 6B is in a shape of a water drop shown in FIG. 6C after being folded. The three patterned regions 03 are located at three positions with a larger bending degree, and the number of through holes 10 in the patterned region located at the position with the largest bending degree is greater.

As shown in FIGS. 5, 6A, and 6B, a projection of each through hole 10 on a first plane perpendicular to the thickness direction of the support plate body 11 is strip-shaped. In this way, when bending is occurred in the patterned region(s) 03 of the support plate 1, the plurality of strip-shaped through holes 10 deform with the bending of the support plate 1, thereby releasing the bending stress, which effectively alleviates a stress concentration of the support plate 1 when being bent, and significantly improves a bending ability of the support plate 1. When the support plate is bent and then unbent, the plurality of strip-shaped through holes can return to an original state, thereby improving an ability of the support plate 1 to return to be flat after being bent. Therefore, the support plate 1 has good bending and unbending effects. In addition, in a case where the support plate 1 is applied to the foldable display, a bending ability of the foldable display, a flatness of the foldable display after the support plate being bent and then unbent, and an ability of the foldable display to return to be flat after being bent may be further improved. Of course, projections of the plurality of through holes 10 on the first plane perpendicular to the thickness direction of the support plate body 11 may also have other shapes such as a circle, an ellipse or any other regular or irregular shape, which is not limited in the embodiments of the present disclosure, as long as the through holes are capable of releasing the bending stress when the support plate 1 is bent.

In some embodiments, the support plate 1 is made of a material with a certain toughness and rigidity, for example, metal, glass, ceramic, or organic material. The toughness of the material ensures a recovery ability of the support plate 1 after being bent and the flatness of the support plate 1 after being bent and then unbent. The rigidity of the material ensures a support performance of the support plate 1.

In some examples, the support plate 1 is made of metal. Metal has high Young's modulus, excellent processability, high material rigidity and toughness, and may be matched with various needs of the foldable display.

In some embodiments, as shown in FIGS. 5, 6A and 6B, each through hole 10 extends in a first direction X on the first plane. That is, extending directions of the plurality of through holes 10 are parallel, and a dimension of each through hole 10 in the first direction X is greater than a dimension thereof in a second direction Y. Here, as shown in FIGS. 5, 6A and 6B, for example, the support plate body 11 is in a rectangular shape, and extending directions of two opposite sides of the support plate body 11 are parallel to the first direction X. The second direction Y is perpendicular to the first direction X on the first plane. In this way, in a case where the support plate 1 is bent along a bending line 12 parallel to the first direction X, each through hole 10 deforms in the second direction Y, and a degree of deformation is the largest, which may release the bending stress to a greatest extent, and improve the bending ability of the support plate 1 and the ability of the support plate 1 to return to be flat after being bent.

It will be noted that, the bending line 12 is a virtual line.

Figure 7A:
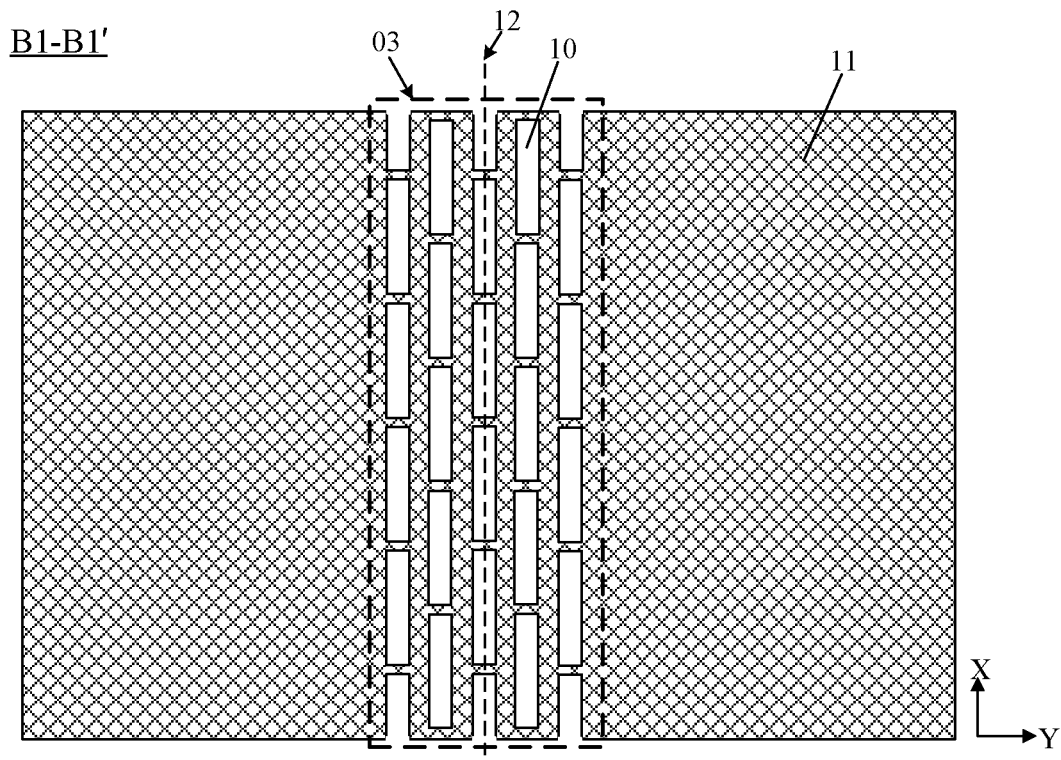
FIG. 7A is yet another cross-sectional view of a support plate in FIG. 1 taken along the B1-B1' direction, in accordance with some embodiments.

In some embodiments, as shown in FIG. 7A, the projection of each of the plurality of through holes 10 on the first plane is in a rectangular shape.

Figure 7B:
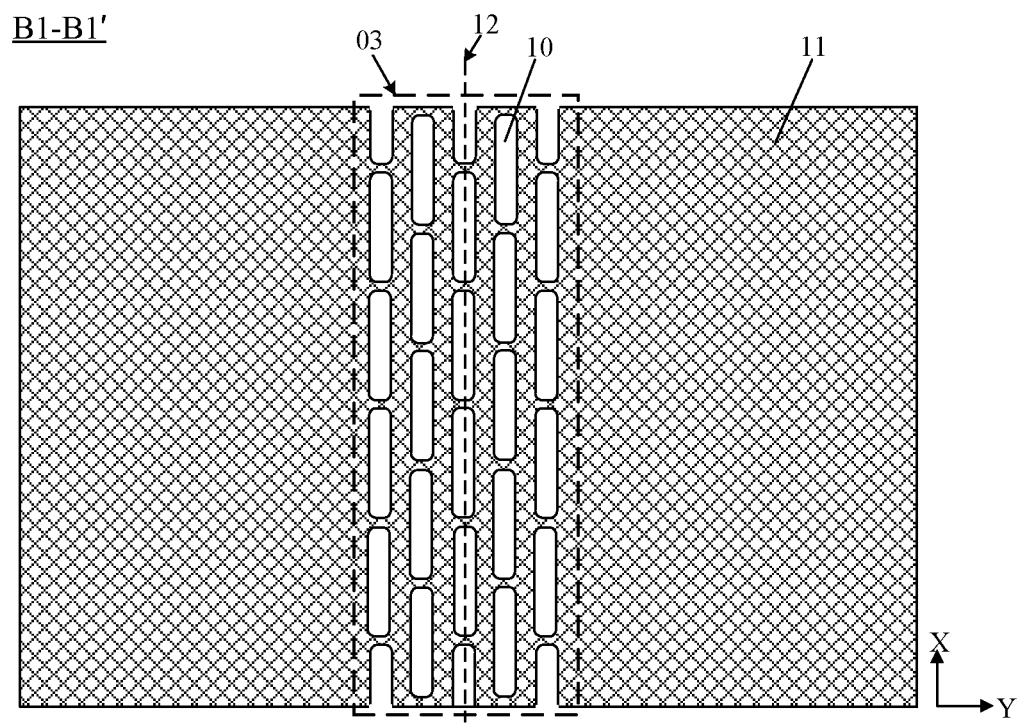
FIG. 7B is yet another cross-sectional view of a support plate in FIG. 1 taken along the B1-B1' direction, in accordance with some embodiments.

In some other embodiments, as shown in FIG. 7B, the projection of each of the plurality of through holes 10 on the first plane is in a rectangular shape with rounded corners. Here, the rectangular shape with rounded corners means that four inner corners of the rectangular shape are all rounded corners. Or, the rectangular shape with rounded corners may also be a rectangular shape with some of inner corners being rounded corners.

In a case where the support plate 1 is bent, as shown in FIG. 7A, if the projection of each through hole 10 on the first plane is in the rectangular shape, the bending stress is concentrated at an intersection point of two right-angled sides of the rectangular shape. As shown in FIG. 7B, if the projection of each through hole 10 on the first plane is in the rectangular shape with rounded corners, and the bending stress is concentrated at intersection points of an arc and two adjacent sides of the rectangular shape with rounded corners.

In yet other embodiments, the projection of at least one of the plurality of through holes 10 on the first plane is in a closed shape composed of two straight line portions and two curved line portions. The two straight line portions extend in the first direction X, and each end of one straight line portion is aligned with an end of another straight line portion in the second direction Y. Each curved line portion is connected to respective ends of the two straight portions that are aligned with each other.

In some examples, each curved line portion is a semi-circle. That is, as shown in FIGS. 5, 6A and 6B, the projection of at least one through hole 10 on the first plane is in a closed shape composed of the two straight line portions and two semicircles. In this way, in the case where the support plate 1 is bent, the bending stress is dispersed to each semicircle, which may disperse the bending stress to a greater degree, improve the bending ability of the support plate 1, and avoid a cracking phenomenon when the support plate 1 is bent.

In yet other embodiments, the plurality of through holes 10 are exactly the same. Here, the phrase "exactly the same" means that the shape of the projection of each through hole 10 on the first plane is exactly the same, and an area of the projection is equal. That is, a size of the projection of each through hole 10 on the first plane is equal.

For example, the projection of each through hole 10 on the first plane is in the closed shape composed of the two straight line portions and the two semicircles, and an area of each closed shape is exactly equal. That is, in the projection of each through hole 10 on the first plane, a length of each straight line portion is equal, a distance between the two straight line portions is equal, and a radius of each semicircle is equal.

For another example, the projection of each through hole 10 on the first plane is in the rectangular shape with rounded corners, and an area of each rectangular shape with rounded corners is equal. That is, a length of each right-angle side of the projection of each through hole 10 on the first plane is equal, and a width of the projection of each through hole 10 on the first plane are equal. In this way, in the case where the support plate 1 is bent, the bending stress is uniformly dispersed, which prevents the support plate 1 from cracking due to uneven distribution of the bending stress.

In yet other embodiments, the plurality of through holes 10 are not exactly the same. Here, the phrase "not exactly the same" means that part are the same and part are different, or all are different.

In some examples, shapes of the projections of the plurality of through holes 10 on the first plane are not exactly the same. For example, projections of a part of through holes 10 on the first plane are each in the rectangular shape, projections of another part of through holes 10 on the first plane are each in the rectangular shape with rounded corners, and projections of yet another part of through holes 10 on the first plane are each in the closed shape composed of the two straight line portions and the two semicircles. For another example, the projections of the plurality of through holes 10 on the first plane are in different shapes.

Figure 8:
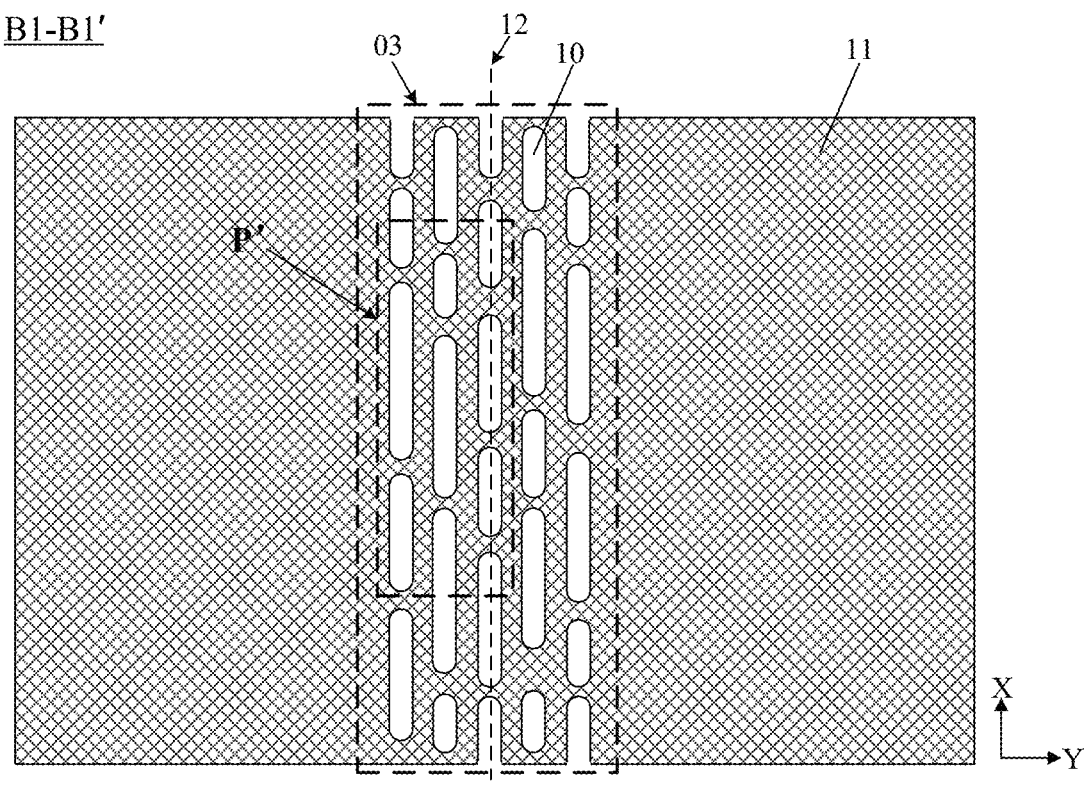
FIG. 8 is yet another cross-sectional view of a support plate in FIG. 1 taken along the B1-B1' direction, in accordance with some embodiments.

In some other examples, as shown in FIG. 8, shapes of projections of through holes 10 on the first plane are exactly the same, but areas of the shapes of the projections are not exactly equal. That is, sizes of the projections of the through holes 10 on the first plane are not exactly the same.

In some embodiments, as shown in FIGS. 5 to 8, the plurality of through holes 10 are arranged in a plurality of columns of through holes 10 in the second direction Y, and any two adjacent columns of through holes 10 are spaced apart. FIGS. 5 to 8 exemplarily illustrate that each column of through holes 10 includes a plurality of through holes 10 arranged in the first direction X. Of course, each column of through holes 10 or each of a part of the plurality of columns of through holes 10 may also include only one through hole 10. The number of through holes 10 arranged in the first direction X in each column of through holes 10 is not limited in the embodiments of the present disclosure.

In some examples, in any two adjacent columns of the plurality of columns of through holes 10, in addition to two through holes 10 at two ends in one column of through holes 10, a projection of any through hole 10 in the one column of through holes 10 on a second plane perpendicular to the second direction Y is overlapped with projections of two adjacent through holes 10 in the other column of through holes 10 on the second plane perpendicular to the second direction Y. For example, as shown in FIG. 6A, a projection of a first through hole 101 on the second plane perpendicular to the second direction Y is overlapped with projections of a second through hole 102 and a third through hole 103 in an adjacent column of through holes 10 on the second plane perpendicular to the second direction Y.

In some other examples, in any two adjacent columns of the plurality of columns of through holes 10, a projection, on the second plane perpendicular to the second direction, of each of two through holes 10 at two ends in one column of through holes 10 is overlapped with projection(s) on the second plane perpendicular to the second direction, of one or two adjacent through holes 10 in the other column of through holes 10. For example, as shown in FIG. 6A, a projection of a fourth through hole 104 in a middle column of through holes 10 on the second plane perpendicular to the second direction Y is overlapped with the projection of the second through hole 102 in the adjacent column of through holes 10 on the second plane perpendicular to the second direction Y. For another example, as shown in FIG. 6A, the projection of the second through hole 102 on the second plane perpendicular to the second direction Y is overlapped with the projections of the first through hole 101 and the fourth through hole 104 in the adjacent column of through holes 10 on the second plane perpendicular to the second direction Y.

Figure 9:
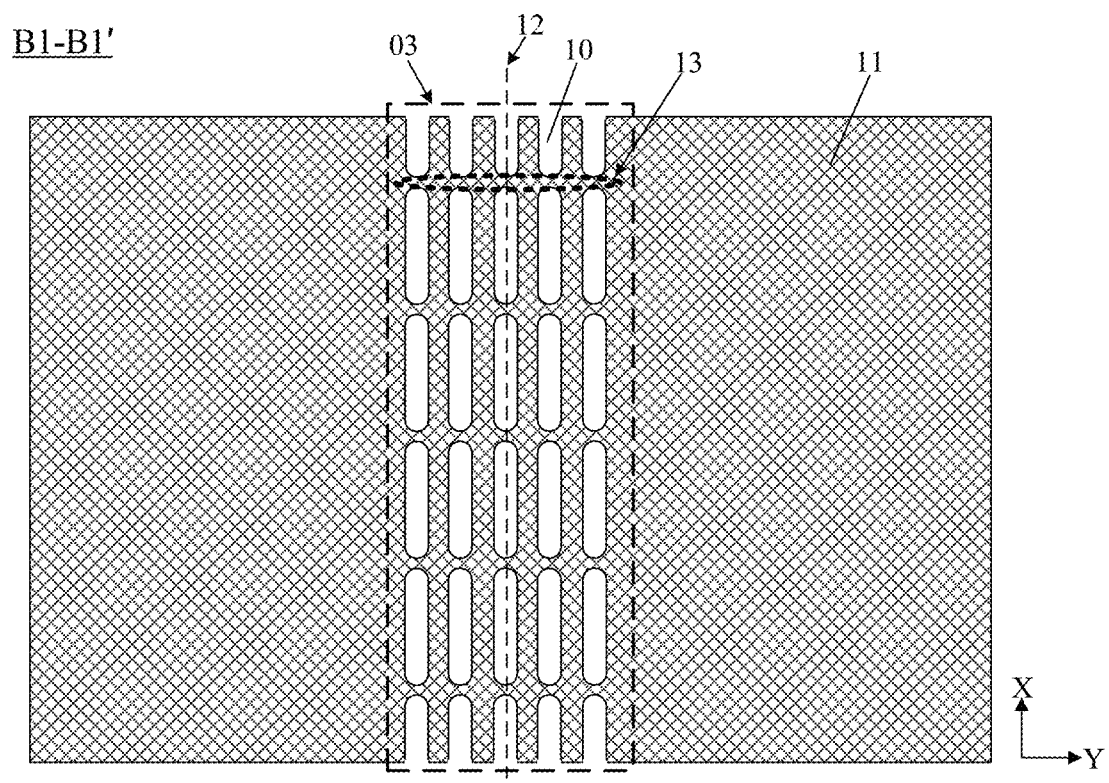
FIG. 9 is yet another cross-sectional view of a support plate in FIG. 1 taken along the B1-B1' direction, in accordance with some embodiments.

As shown in FIG. 9, in any two adjacent columns of the plurality of columns of through holes 10, a projection of any through hole 10 in one column of through holes 10 on the second plane perpendicular to the second direction Y is completely overlapped with a projection of a corresponding through hole 10 in the other column of through holes 10 on the second plane perpendicular to the second direction Y. Based on this, an entity portion between any two adjacent through holes 10 in each column of through holes 10 and an entity portion between two adjacent through holes 10 in an adjacent column of through holes 10 are continuous in the second direction Y, which is indicated by an elliptical dashed circle 13 shown in FIG. 9.

In the arrangement manners (i.e., a plurality of through holes 10 in two adjacent columns of through holes 10 are arranged in a staggered manner in the second direction Y) of the plurality of columns of through holes 10 shown in FIGS. 5 to 8, the entity portion between any two adjacent through holes 10 in each column of through holes 10 faces one through hole 10 in an adjacent column of through holes 10 in the second direction Y, so that a large stress on the entity portion may be avoided, and the bending ability of the support plate 1 is effectively improved.

Figure 10:
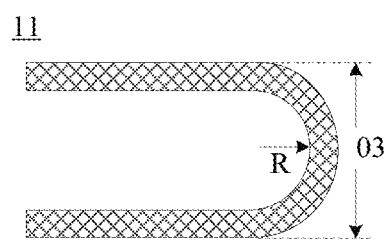
FIG. 10 is a schematic structural diagram of a support plate after being folded, in accordance with some embodiments.
Figure 12:
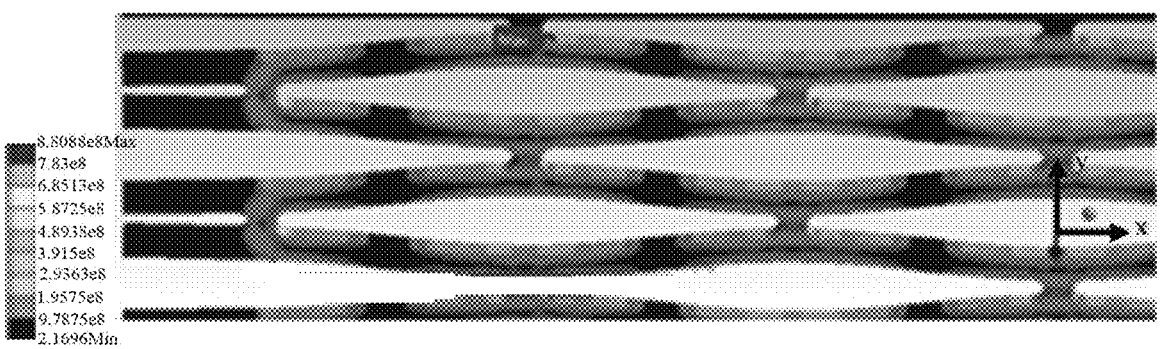
FIG. 12 is a cloud diagram of stress distribution in a folding region of the support plate in FIG. 5 after being folded.

In some examples, as shown in FIGS. 5 to 7B, in any two adjacent columns of the plurality of columns of through holes 10, a projection of the portion between any two through holes 10 in one column of through holes 10 on the second plane is located in the middle of a projection of one through hole 10 in the other column of through holes 10 on the second plane. Referring to FIG. 12, the support plate 1 is modeled, and a cloud diagram of stress distribution of the support plate 1 after being bent is analyzed using a software. According to the cloud diagram of stress distribution, relationships of a maximum value $A_{max}$ of lengths of the plurality of through holes 10 in the first direction X, a minimum value $B_{min}$ of second distances each between every two adjacent through holes 10 in a same column of through holes 10 in the first direction X, a minimum value $C_{min}$ of first distances each between any through hole 10 in a column of through holes 10 and any through hole 10 in an adjacent column of through holes 10 in the second direction Y, a maximum value $D_{max}$ of widths of the plurality of through holes 10 in the second direction, a bending radius R (as shown in FIG. 10) of the support plate body 11 bending along the bending line 12 parallel to the first direction X in the patterned region 03, and a thickness t of the support plate body 11 may be obtained.

Here, the length of each through hole 10 in the first direction X is a maximum length of the through hole 10 in the first direction X, and the maximum value $A_{max}$ is a maximum value of a plurality of maximum lengths. The second distance between every two adjacent through holes 10 in the same column of through holes 10 in the first direction X is a minimum second distance between the two through holes 10 in the first direction X, and the minimum value $B_{min}$ is a minimum value of a plurality of minimum second distances. The first distance between any through hole 10 in a column of through holes 10 and any through hole 10 in an adjacent column of through holes 10 in the second direction Y is a minimum first distance between the two through holes 10 in the second direction, and the minimum value $C_{min}$ is a minimum value of a plurality of minimum first distances. The width of each through hole 10 in the second direction Y is a maximum width of the through hole 10 in the second direction Y, and the maximum value $D_{max}$ is a maximum value of a plurality of maximum widths.

Figure 11:
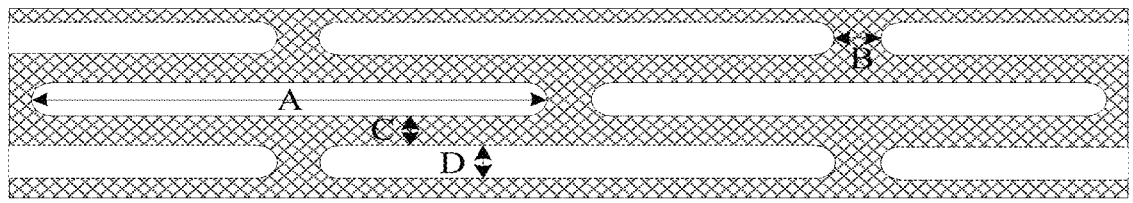
FIG. 11 is a partial enlarged schematic diagram of P in FIG. 5.

For example, as shown in FIG. 5 and FIG. 11 (FIG. 11 is a partial enlarged schematic diagram of P in FIG. 5), for through holes whose projections on the first plane are all in the closed shape, the shape of the projection of each through hole 10 on the first plane is exactly the same and has a same area, and is uniformly arranged in the patterned region 03. In this way, the maximum length A of each through hole 10 in the first direction X is equal, i.e., $A_{max}$ is equal to A. The minimum second distance B between every two adjacent through holes 10 in the first direction X is equal, i.e., $B_{min}$ is equal to B. The minimum first distance C between any through hole in a column of through holes 10 and any through hole 10 in an adjacent column of through holes in the second direction Y is equal, i.e., $C_{min}$ is equal to C. The maximum width D of each through hole 10 in the second direction Y is equal, i.e., $D_{max}$ is equal to D.

Figure 13:
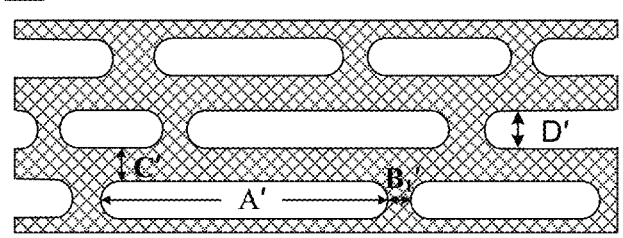
FIG. 13 is a partial enlarged schematic diagram of P' in FIG. 8.

For another example, as shown in FIG. 13 (FIG. 13 is a partial enlarged schematic diagram of P' in FIG. 8), for through holes whose projections on the first plane are all in the closed shape, the shapes of the projections of the through holes 10 on the first plane are exactly the same, but the areas thereof are not exactly the same (that is, the sizes thereof are not exactly the same). The maximum lengths of the plurality of through holes 10 in the first direction X are not exactly equal. That is, the plurality of through holes 10 have maximum lengths, and the maximum value $A_{max}$ is the maximum value A' of the maximum lengths. In a same column of through holes 10 of the plurality of through holes 10, the minimum second distances each between every two adjacent through holes 10 in the first direction X are not exactly equal. That is, the same column of through holes 10 has minimum second distances, and the minimum value $B_{min}$ is the minimum value B' of the minimum second distances. In any two adjacent columns of the plurality of columns of through holes 10, the minimum first distances each between any through hole in one column of through holes 10 and any through hole 10 in an adjacent column of through holes in the second direction Y are not exactly equal. That is, the two adjacent columns of through holes 10 have minimum first distances, and the minimum value $C_{min}$ is the minimum value C' of the minimum first distances. The maximum width of each of the plurality of through holes 10 in the second direction Y is equal, i.e., $D_{max}$ is equal to D'.

In some embodiments, the maximum value $A_{max}$, the minimum value $C_{min}$ and the bending radius R satisfy a formula:

$$\frac{10^6 \times C_{min}^3}{R \times A_{max}^3} \leq 30.$$

Units of the maximum value $A_{max}$, the minimum value $C_{min}$ and the bending radius R in the above formula are the same. For example, the units are all in millimeters (mm).

In this way, by designing the maximum value $A_{max}$ and the minimum value $C_{min}$ of the plurality of through holes 10, i.e., designing the shapes of the plurality of through holes 10 and the arrangement manner of the plurality of through holes 10 in the patterned region 03, it is possible to match the support plate body 11 with a smaller bending radius to improve the bending ability of the support plate 1, so as to improve the folding effects of the foldable display in which the support plate 11 is provided.

In some other embodiments, the maximum value $A_{max}$, the minimum value $C_{min}$ and the bending radius R satisfy the formula:

$$\frac{10^6 \times C_{min}^3}{R \times A_{max}^3} \leq 30;$$

and the minimum value $C_{min}$ and the thickness t of the support plate body 11 satisfy a condition that t: $C_{min}$=1~4. In this way, in a case where the minimum bending radius is satisfied, the thickness of the support plate body may be reduced to a greatest extent, so as to reduce a thickness of the foldable display in which the support plate body is provided.

In yet other embodiments, the maximum value $A_{max}$, the minimum value $C_{min}$ and the bending radius R satisfy the formula:

$$\frac{10^6 \times C_{min}^3}{R \times A_{max}^3} \leq 30;$$

and the maximum value $D_{max}$ and the minimum value $C_{min}$ satisfy a condition that $D_{max}$: $C_{min}$=1~5.

In yet other embodiments, the maximum value $A_{max}$, the minimum value $C_{min}$ and the bending radius R satisfy the formula:

$$\frac{10^6 \times C_{min}^3}{R \times A_{max}^3} \leq 30;$$

the minimum value $C_{min}$ and the thickness t of the support plate body 11 satisfy a condition that t: $C_{min}$=1~4, and the maximum value $D_{max}$ and the minimum value $C_{min}$ satisfy a condition that $D_{max}$: $C_{min}$=1~5.

In yet other embodiments, the maximum value $A_{max}$, the minimum value $C_{min}$ and the bending radius R satisfy the formula:

$$\alpha = \frac{10^6 \times C_{min}^3}{R \times A_{max}^3};$$

and the minimum value $B_{min}$ and the minimum value $C_{min}$ satisfy a condition that $B_{min}$: $C_{min}$=0.5~4.

In yet other embodiments, the maximum value $A_{max}$, the minimum $C_{min}$ and the bending radius R satisfy the formula:

$$\alpha = \frac{10^6 \times C_{min}^3}{R \times A_{max}^3};$$

the minimum value $C_{min}$ and the thickness t of the support plate body 11 satisfy a condition that t: $C_{min}$=1~4, the maximum value $D_{max}$ and the minimum value $C_{min}$ satisfy a condition that $D_{max}$: $C_{min}$=1~5, and the minimum value $B_{min}$ and the minimum $C_{min}$ satisfy a condition that $B_{min}$: $C_{min}$=0.5~4.

In yet other embodiments, the maximum value $A_{max}$, the minimum value $C_{min}$ and the bending radius R satisfy the formula:

$$\alpha = \frac{10^6 \times C_{min}^3}{R \times A_{max}^3};$$

and the maximum value $A_{max}$ and the minimum value $B_{min}$ satisfy a condition that $A_{max}$: $B_{min}$=10~100.

In yet other embodiments, the maximum value $A_{max}$, the minimum value $C_{min}$ and the bending radius R satisfy the formula:

$$\frac{10^6 \times C_{min}^3}{R \times A_{max}^3} \leq 30;$$

the minimum value $C_{min}$ and the thickness t of the support plate body 11 satisfy a condition that t: $C_{min}$=1~4, the maximum value $D_{max}$ and the minimum value $C_{min}$ satisfy a condition that $D_{max}$: $C_{min}$=1~5, the minimum value $B_{min}$ and the minimum value $C_{min}$ satisfy a condition that $B_{min}$: $C_{min}$=0.5~4, and the maximum value $A_{max}$ and the minimum value $B_{min}$ satisfy a condition that $A_{max}$: $B_{min}$=10~100. In this way, parameters such as the sizes of the through holes 10 in the patterned region 03, the distances between the through holes 10, and the thickness of the support plate 1 are designed according to different bending radii R, so as to ensure that a maximum stress to which the support plate 1 is subjected is less than a stress of the material of the support plate 1 when the support plate 1 is bent at the bending radius R, i.e., to ensure that the support plate 1 does not crack when the support plate 1 is bent along the bending line 12 with the bending radius R, and the support plate 1 has a strong ability of returning to be flat after the support plate 1 is bent at different bending degrees and then unbent.

In some embodiments, referring to FIGS. 5 to 9, in a case where actual length(s) of two through holes 10 at two ends or one through hole 10 at an end in at least one column of through holes 10 in the first direction X are less than $A_{max}$, an end of the through hole 10 at the end of the column of through holes 10 is not closed. That is, the through hole 10 makes the support plate body 11 form a gap at the end in the first direction X.

For example, as shown in FIG. 5, the plurality of through holes 10 are arranged in five columns of through holes 10 in the second direction Y in the patterned region 03. In a first column of through holes 10, a third column of through holes 10 and a fifth column of through holes 10, ends of two through holes 10 at two ends of each column of through holes 10 located at edges of the support plate body are not closed.

For another example, as shown in FIG. 8, the plurality of through holes 10 are arranged in five columns of through holes 10 in the second direction Y in the patterned region 03. An end of one through hole 10 at an end of a first column of through holes 10 located at an edge of the support plate body is not closed. In each of a third column of through holes 10 and a fifth column of through holes 10, ends of two through holes 10 at two ends located at edges of the support plate body are not closed.

Figure 16:
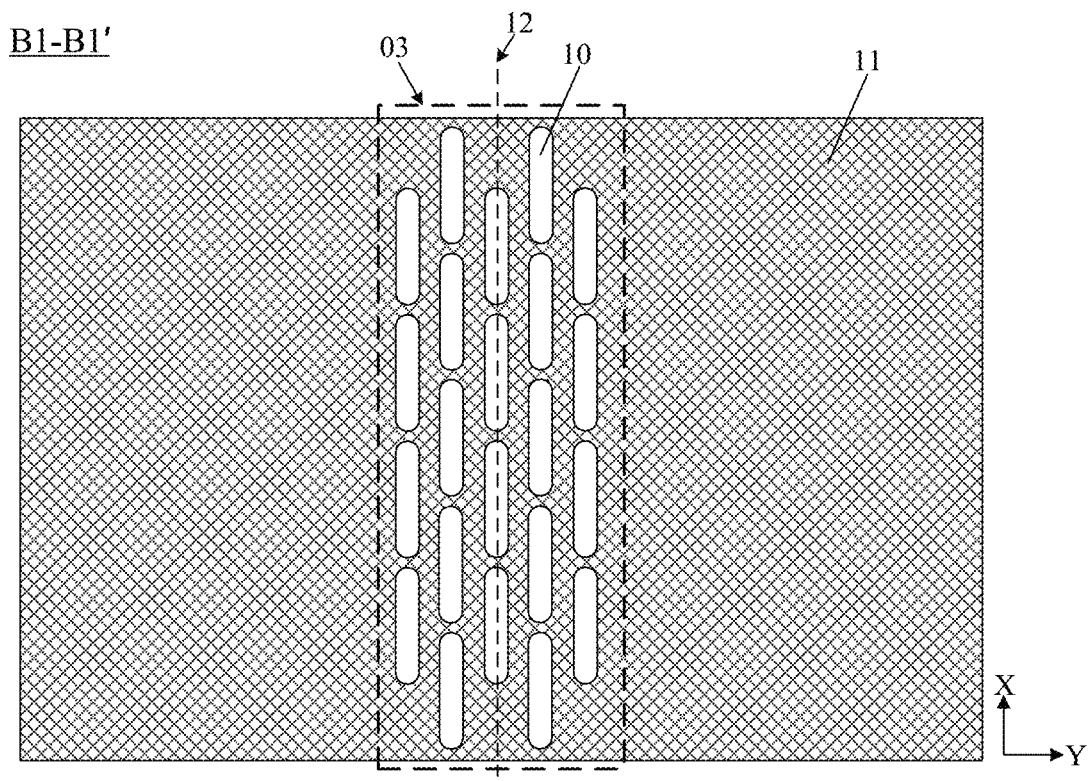
FIG. 16 is yet another cross-sectional view of a support plate in FIG. 1 taken along the B1-B1' direction, in accordance with some embodiments.
Figure 17:
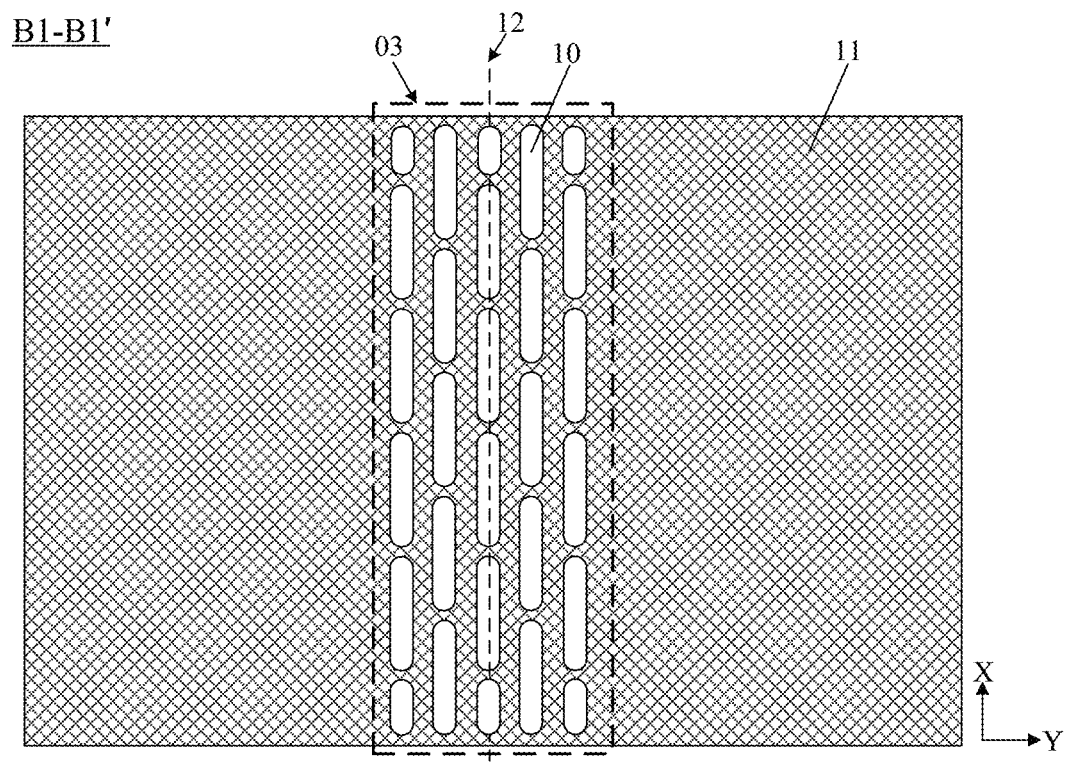
FIG. 17 is yet another cross-sectional view of a support plate in FIG. 1 taken along the B1-B1' direction, in accordance with some embodiments.
Figure 18:
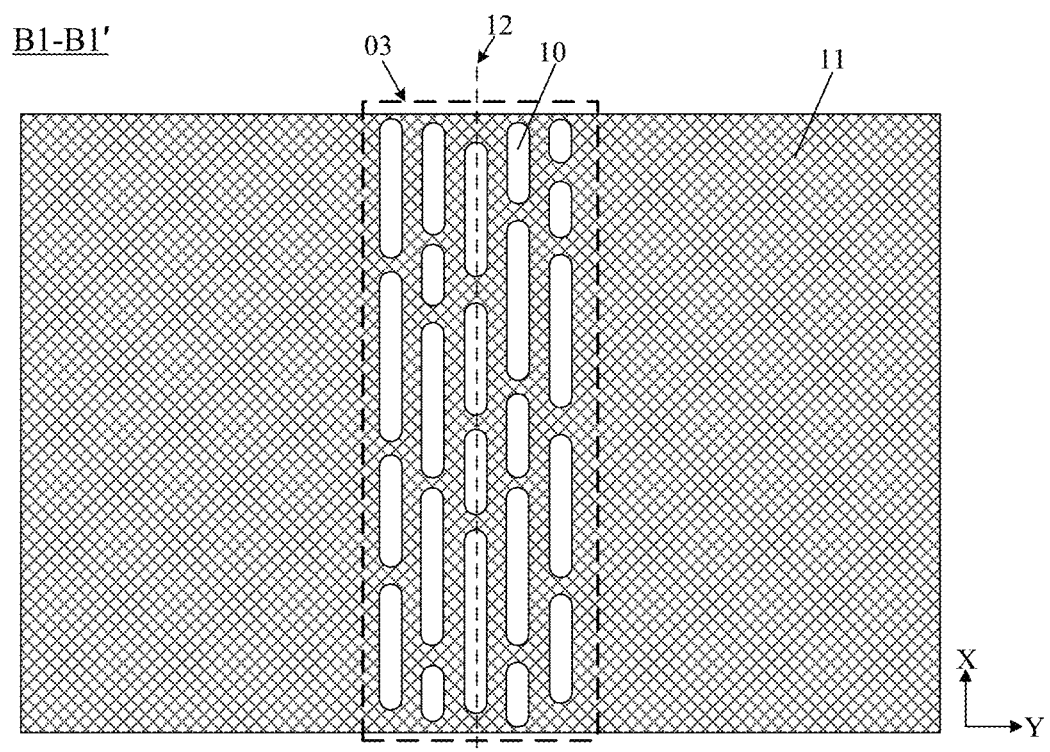
FIG. 18 is yet another cross-sectional view of a support plate in FIG. 1 taken along the B1-B1' direction, in accordance with some embodiments.

In some other embodiments, referring to FIGS. 16 to 18, two through holes 10 at two ends of each column of through holes 10 are closed through holes.

For example, as shown in FIG. 16, the plurality of through holes 10 are arranged in five columns of through holes 10 in the second direction Y in the patterned region 03. Two through holes 10 at two ends of each column of through holes 10 are closed through holes, and the shape of the projection of each through hole 10 on the first plane is exactly the same, and the area of the projection is exactly equal.

For another example, as shown in FIG. 17, the plurality of through holes 10 are arranged in five columns of through holes 10 in the second direction Y in the patterned region 03. Two through holes 10 at two ends of each column of through holes 10 are closed through holes. In addition to the two through holes 10 at the two ends of each column of through holes 10, the shapes of the projections of other through holes 10 on the first plane are exactly the same, and the areas of the projections of the other through holes 10 on the first plane are exactly equal. The shapes of the projections of the two through holes 10 at the two ends of each column of through holes 10 on the first plane are exactly the same, and the areas of the projections of the two through holes 10 at the two ends of each column of through holes 10 on the first plane are exactly equal.

For another example, as shown in FIG. 18, the plurality of through holes 10 are arranged in five columns of through holes 10 in the second direction Y in the patterned region 03. Two through holes 10 at two ends of each column of through holes 10 are closed through holes. In addition, the shapes of the projections of the plurality of through holes 10 on the first plane are exactly the same, and the areas of the projections are not exactly equal.

In some embodiments, the maximum length of each through hole 10 in the first direction X is within a range of 1 mm to 50 mm, and the thickness t of the support plate body 11 is within a range of 0.01 mm to 0.5 mm.

For example, the maximum length of each through hole 10 in the first direction X may be 1 mm, 2 mm, 5 mm, 8 mm, 10 mm, 15 mm, 20 mm, 25 mm, 30 mm or 50 mm. The thickness t of the support plate body 11 may be 0.01 mm, 0.05 mm, 0.1 mm, 0.2 mm or 0.5 mm.

A variety of specific examples are provided below to describe values of the above parameters in detail. The shapes of the projections of the plurality of through holes 10 on the first plane and the arrangement manner thereof in the patterned region 03 shown in FIG. 5 are taken as examples. For through holes whose projections on the first plane are all in the closed shape, the shape of the projection of each through hole 10 on the first plane is the same and the area thereof is equal, and the second distance of every two adjacent through holes 10 in the first direction X is equal, and the first distance of every adjacent two through holes 10 in the second direction Y is equal.

For example, the maximum length A of each through hole 10 in the first direction X is 4 mm. The minimum second distance B between every two adjacent through holes 10 in a same column of through holes 10 in the first direction X is 0.2 mm. The minimum first distance C between any through hole 10 in a column of through holes 10 and any through hole 10 in an adjacent column of through holes 10 in the second direction Y is 0.2 mm. The maximum width D of each through hole 10 in the second direction Y is 0.2 mm.

The thickness t of the support plate body 11 is 0.2 mm. For another example, the maximum length A of each through hole 10 in the first direction X is 6 mm. The minimum second distance B between every two adjacent through holes 10 in a same column of through holes 10 in the first direction X is 0.1 mm. The minimum first distance C between any through hole 10 in a column of through holes 10 and any through hole 10 in an adjacent column of through holes 10 in the second direction Y is 0.1 mm. The maximum width D of each through hole 10 in the second direction Y is 0.3 mm. The thickness t of the support plate body 11 is 0.15 mm.

For another example, the maximum length A of each through hole 10 in the first direction X is 9 mm. The minimum second distance B between every two adjacent through holes 10 in a same column of through holes 10 in the first direction X is 0.1 mm. The minimum first distance C between any through hole 10 in a column of through holes 10 and any through hole 10 in an adjacent column of through holes 10 in the second direction Y is 0.1 mm. The maximum width D of each through hole 10 in the second direction Y is 0.1 mm. The thickness t of the support plate body 11 is 0.1 mm.

For example, the maximum length A of each through hole 10 in the first direction X is 4 mm. The minimum second distance B between every two adjacent through holes 10 in a same column of through holes 10 in the first direction X is 0.2 mm. The minimum first distance C between any through hole 10 in a column of through holes 10 and any through hole 10 in an adjacent column of through holes 10 in the second direction Y is 0.2 mm. The maximum width D of each through hole 10 in the second direction Y is 0.2 mm. The thickness t of the support plate body 11 is 0.2 mm, and the bending radius R is 5 mm. According to the formula $$\alpha = \frac{10^6 \times C^3}{R \times A^3},$$

α is calculated to be 25, and a is less than 30. Here, attention is only paid to the calculated value of a rather than its unit of measurement. A bending test is performed on the support plate 1 for 200,000 times at the bending radius R of 5 mm, and the test result is that the support plate 1 passes the test without a cracking phenomenon, and has a good ability of returning to be flat.

For another example, the maximum length A of each through hole 10 in the first direction X is 6 mm. The minimum second distance B between every two adjacent through holes 10 in a same column of through holes 10 in the first direction X is 0.2 mm. The minimum first distance C between any through hole 10 in a column of through holes 10 and any through hole 10 in an adjacent column of through holes 10 in the second direction Y is 0.2 mm. The maximum width D of each through hole 10 in the second direction Y is 0.2 mm. The thickness t of the support plate body 11 is 0.2 mm, and the bending radius R is 3 mm. α is 12.3457, and a is less than 30. The bending test is performed on the support plate 1 for 200,000 times at the bending radius R of 3 mm. The test result is that the support plate 1 passes the test without the cracking phenomenon, and has the good ability of returning to be flat.

For another example, the maximum length A of each through hole 10 in the first direction X is 6 mm. The minimum second distance B between every two adjacent through holes 10 in a same column of through holes 10 in the first direction X is 0.1 mm. The minimum first distance C between any through hole 10 in a column of through holes 10 and any through hole 10 in an adjacent column of through holes 10 in the second direction Y is 0.1 mm. The maximum width D of each through hole 10 in the second direction Y is 0.1 mm. The thickness t of the support plate body 11 is 0.1 mm, and the bending radius R is 1.5 mm. α is calculated to be 3.08642, and a is less than 30. The bending test is performed on the support plate 1 for 200,000 times at the bending radius R of 1.5 mm. The test result is that the support plate 1 passes the test without the cracking phenomenon, and has the good ability of returning to be flat.

For another example, the maximum length A of each through hole 10 in the first direction X is 4 mm. The minimum second distance B between every two adjacent through holes 10 in a same column of through holes 10 in the first direction X is 0.1 mm. The minimum first distance C between any through hole 10 in a column of through holes 10 and any through hole 10 in an adjacent column of through holes 10 in the second direction Y is 0.1 mm. The maximum width D of each through hole 10 in the second direction Y is 0.2 mm. The thickness t of the support plate body 11 is 0.15 mm, and the bending radius to R is 1.5 mm. α is calculated to be 10.4167, and a is less than 30. The bending test is performed on the support plate 1 for 200,000 times at the bending radius R of 1.5 mm. The test result is that the support plate 1 passes the test without the cracking phenomenon, and has the good ability of returning to be flat.

For another example, the maximum length A of each through hole 10 in the first direction X is 4.5 mm. The minimum second distance B between every two adjacent through holes 10 in a same column of through holes 10 in the first direction X is 0.2 mm. The minimum first distance C between any through hole 10 in a column of through holes 10 and any through hole 10 in an adjacent column of through holes 10 in the second direction Y is 0.15 mm. The maximum width D of each through hole 10 in the second direction Y is 0.2 mm. The thickness t of the support plate body 11 is 0.15 mm, and the bending radius R is 3 mm. α is calculated to be 12.3457, and a is less than 30. The bending test is performed on the support plate 1 for 200,000 times at the bending radius R of 3 mm. The test result is that the support plate 1 passes the test without the cracking phenomenon, and has the good ability of returning to be flat.

For another example, the maximum length A of each through hole 10 in the first direction X is 2 mm. The minimum second distance B between every two adjacent through holes 10 in a same column of through holes 10 in the first direction X is 0.2 mm. The minimum first distance C between any through hole 10 in a column of through holes 10 and any through hole 10 in an adjacent column of through holes 10 in the second direction Y is 0.1 mm. The maximum width D of each through hole 10 in the second direction Y is 0.2 mm. The thickness t of the support plate body 11 is 0.15 mm, and the bending radius R is 5 mm. α is calculated to be 25, and a is less than 30. The bending test is performed on the support plate 1 for 200,000 times at the bending radius R of 5 mm. The test result is that the support plate 1 passes the test without the cracking phenomenon, and has the to good ability of returning to be flat.

For another example, the maximum length A of each through hole 10 in the first direction X is 10 mm. The minimum second distance B between every two adjacent through holes 10 in a same column of through holes 10 in the first direction X is 0.1 mm. The minimum first distance C between any through hole 10 in a column of through holes 10 and any through hole 10 in an adjacent column of through holes 10 in the second direction Y is 0.1 mm. The maximum width D of each through hole 10 in the second direction Y is 0.2 mm. The thickness t of the support plate body 11 is 0.15 mm, and the bending radius R is 5 mm. α is calculated to be 0.2, and a is less than 30. The bending test is performed on the support plate 1 for 200,000 times at the bending radius R of 5 mm. The test result is that the support plate 1 passes the test without the cracking phenomenon, and has the good ability of returning to be flat. For another example, the maximum length A of each through hole 10 in the first direction X is 5 mm. The minimum second distance B between every two adjacent through holes 10 in a same column of through holes 10 in the first direction X is 0.4 mm. The minimum first distance C between any through hole 10 in a column of through holes 10 and any through hole 10 in an adjacent column of through holes 10 in the second direction Y is 0.1 mm. The maximum width D of each through hole 10 in the second direction Y is 0.2 mm. The thickness t of the support plate body 11 is 0.2 mm, and the bending radius R is 1.5 mm. α is calculated to be 5.33, and a is less than 30. The bending test is performed on the support plate 1 for 200,000 times at the bending radius R of 1.5 mm. The test result is that the support plate 1 passes the test without the cracking phenomenon, and has the good ability of returning to be flat.

For another example, the maximum length A of each through hole 10 in the first direction X is 10 mm. The minimum second distance B between every two adjacent through holes 10 in a same column of through holes 10 in the first direction X is 0.1 mm. The minimum first distance C between any through hole 10 in a column of through holes 10 and any through hole 10 in an adjacent column of through holes 10 in the second direction Y is 0.2 mm. The maximum width D of each through hole 10 in the second direction Y is 0.4 mm. The thickness t of the support plate body 11 is 0.2 mm, and the bending radius R is 3 mm. α is calculated to be 2.67, and a is less than 30. The bending test is performed on the support plate 1 for 200,000 times at the bending radius R of 3 mm. The test result is that the support plate 1 passes the test without the cracking phenomenon, and has the good ability of returning to be flat.

For another example, the maximum length A of each through hole 10 in the first direction X is 6 mm. The minimum second distance B between every two adjacent through holes 10 in a same column of through holes 10 in the first direction X is 0.1 mm. The minimum first distance C between any through hole 10 in a column of through holes 10 and any through hole 10 in an adjacent column of through holes 10 in the second direction Y is 0.1 mm. The maximum width D of each through hole 10 in the second direction Y is 0.1 mm. The thickness t of the support plate body 11 is 0.1 mm, and the bending radius R is 1.5 mm. α is calculated to be 3.09, and a is less than 30. The bending test is performed on the support plate 1 for 200,000 times with the bending radius R of 1.5 mm. The test result is that the support plate 1 passes the test without the cracking phenomenon, and has the good ability of returning to be flat.

For another example, the maximum length A of each through hole 10 in the first direction X is 6 mm. The minimum second distance B between every two adjacent through holes 10 in a same column of through holes 10 in the first direction X is 0.2 mm. The minimum first distance C between any through hole 10 in a column of through holes 10 and any through hole 10 in an adjacent column of through holes 10 in the second direction Y is 0.2 mm. The maximum width D of each through hole 10 in the second direction Y is 0.5 mm. The thickness t of the support plate body 11 is 0.2 mm, and the bending radius R is 2 mm. α is calculated to be 18.52, and a is less than 30. The bending test is performed on the support plate 1 for 200,000 times at the bending radius R of 2 mm. The test result is that the support plate 1 passes the test without the cracking phenomenon, and has the good ability of returning to be flat.

For another example, the maximum length A of each through hole 10 in the first direction X is 8 mm. The minimum second distance B between every two adjacent through holes 10 in a same column of through holes 10 in the first direction X is 0.1 mm. The minimum first distance C between any through hole 10 in a column of through holes 10 and any through hole 10 in an adjacent column of through holes 10 in the second direction Y is 0.1 mm. The maximum width D of each through hole 10 in the second direction Y is 0.1 mm. The thickness t of the support plate body 11 is 0.4 mm, and the bending radius R is 5 mm. α is calculated to be 0.39, and a is less than 30. The bending test is performed on the support plate 1 for 200,000 times at the bending radius R of 5 mm. The test result is that the support plate 1 passes the test without the cracking phenomenon, and has the good ability of returning to be flat.

Several specific examples are further provided below to describe values of the above parameters in detail. The shapes of the projections of the plurality of through holes 10 on the first plane and the arrangement manner thereof in the patterned region 03 shown in FIG. 8 are taken as examples. For through holes whose projections on the first plane are all in the closed shape, the shapes of the projections of the through holes 10 on the first plane are the same, but the areas thereof are not exactly equal.

For example, the maximum value $A_{max}$ of the lengths of the plurality of through holes 10 in the first direction X is 5 mm. The minimum value $B_{min}$ of the second distances each between every two adjacent through holes 10 in a same column of through holes 10 in the first direction X is 0.2 mm. The minimum value $C_{min}$ of the first distances each between any through hole 10 in a column of through holes 10 and any through hole 10 in an adjacent column of through holes 10 in the second direction Y is 0.2 mm. The maximum value $D_{max}$ of the widths of the plurality of through holes 10 in the second direction is 0.2 mm. The thickness t of the support plate body 11 is 0.2 mm, and the bending radius R is 6 mm. According to the formula:

$$\alpha = \frac{10^6 \times C_{min}^3}{R \times A_{max}^3},$$

α is calculated to be 10.666667, and a is less than 30. The bending test is performed on the support plate 1 for 200,000 times at the bending radius R of 6 mm. The test result is that the support plate 1 passes the test without the cracking phenomenon, and has the good ability of returning to be flat.

For another example, the maximum value $A_{max}$ of the lengths of the plurality of through holes 10 in the first direction X is 5 mm. The minimum value $B_{min}$ of the second distances each between every two adjacent through holes 10 in a same column of through holes 10 in the first direction X is 0.2 mm. The minimum value $C_{min}$ of the first distances each between any through hole 10 in a column of through holes 10 and any through hole 10 in an adjacent column of through holes 10 in the second direction Y is 0.2 mm. The maximum value $D_{max}$ of the widths of the plurality of through holes 10 in the second direction is 0.2 mm. The thickness t of the support plate body 11 is 0.2 mm, and the bending radius R is 3 mm. α is calculated to be 21.333333, and a is less than 30. The bending test is performed on the support plate 1 for 200,000 times at the bending radius R of 3 mm. The test result is that the support plate 1 passes the test without the cracking phenomenon, and has the good ability of returning to be flat.

For another example, the maximum value $A_{max}$ of the lengths of the plurality of through holes 10 in the first direction X is 5 mm. The minimum value $B_{min}$ of the second distances each between every two adjacent through holes 10 in a same column of through holes 10 in the first direction X is 0.1 mm. The minimum value $C_{min}$ of the first distances each between any through hole 10 in a column of through holes 10 and any through hole 10 in an adjacent column of through holes 10 in the second direction Y is 0.1 mm. The maximum value $D_{max}$ of the widths of the plurality of through holes 10 in the second direction is 0.1 mm. The thickness t of the support plate body 11 is 0.1 mm, and the bending radius R is 1.5 mm. α is calculated to be 5.333333, and a is less than 30. The bending test is performed on the support plate 1 for 200,000 times at the bending radius R of 1.5 mm. The test result is that the support plate 1 passes the test without the cracking phenomenon, and has the good ability of returning to be flat.

For another example, the maximum value $A_{max}$ of the lengths of the plurality of through holes 10 in the first direction X is 5 mm. The minimum value $B_{min}$ of the second distances each between every two adjacent through holes 10 in a same column of through holes 10 in the first direction X is 0.1 mm. The minimum value $C_{min}$ of the first distances each between any through hole 10 in a column of through holes 10 and any through hole 10 in an adjacent column of through holes 10 in the second direction Y is 0.1 mm. The maximum value $D_{max}$ of the widths of the plurality of through holes 10 in the second direction is 0.2 mm. The thickness t of the support plate body 11 is 0.15 mm, and the bending radius R is 2 mm. α is calculated to be 4, and a is less than 30. The bending test is performed on the support plate 1 for 200,000 times at the bending radius R of 2 mm. The test result is that the support plate 1 passes the test without the cracking phenomenon, and has the good ability of returning to be flat.

For another example, the maximum value $A_{max}$ of the lengths of the plurality of through holes 10 in the first direction X is 4.5 mm. The minimum value $B_{min}$ of the second distances each between every two adjacent through holes 10 in a same column of through holes 10 in the first direction X is 0.2 mm. The minimum value $C_{min}$ of the first distances each between any through hole 10 in a column of through holes 10 and any through hole 10 in an adjacent column of through holes 10 in the second direction Y is 0.15 mm. The maximum value $D_{max}$ of the widths of the plurality of through holes 10 in the second direction is 0.2 mm. The thickness t of the support plate body 11 is 0.15 mm, and the bending radius R is 3 mm. α is calculated to be 12.3457, and a is less than 30. The bending test is performed on the support plate 1 for 200,000 times at the bending radius R of 3 mm. The test result is that the support plate 1 passes the test without the cracking phenomenon, and has the good ability of returning to be flat.

Figure 14:
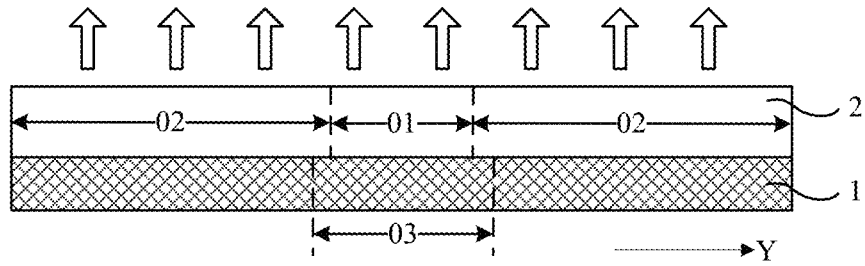
FIG. 14 is a schematic structural diagram of yet another foldable display, in accordance with some embodiments.

Some embodiments of the present disclosure provide the foldable display. As shown in FIG. 14, the foldable display includes the flexible display panel 2 in any one of the above embodiments and the support plate 1 in any one of the above embodiments. The support plate 1 is disposed on the side of the flexible display panel 2 opposite to the light exit side.

As shown in FIG. 14, the flexible display panel 2 has bending display portion(s) 01, and a folded state of the foldable display may be achieved by bending the bending display portion(s) 01. For example, the flexible display panel 2 has one bending display portion 01. For another example, the flexible display panel 2 has two or more bending display portions 01. The number of the bending display portion(s) 01 of the flexible display panel 2 is not limited in the embodiments of the present disclosure, which may be set according to needs. FIG. 14 illustrates an example in which the flexible display panel 2 has one bending display portion 01.

In the embodiments of the present disclosure, the support plate 1 is disposed on the side of the flexible display panel 2 opposite to the light exit side of the flexible display panel 2. The support plate 1 is configured to support the flexible display panel 2. In addition, after the foldable display is folded and then unfolded, if an uneven phenomenon occur on the bending display portion(s) 01, the support plate 1 may improve the flatness of the foldable display after being unfolded and the ability of returning to be flat after being folded.

Figure 15:
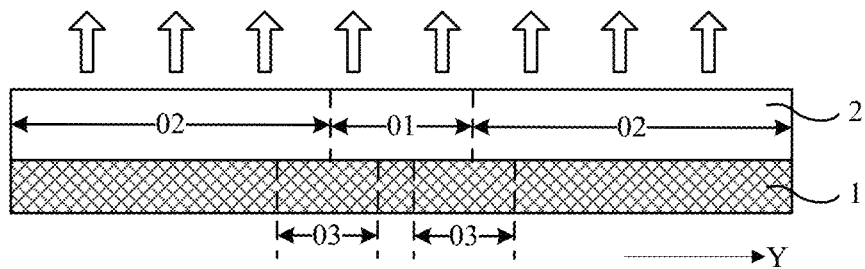
FIG. 15 is a schematic structural diagram of yet another foldable display, in accordance with some embodiments.

As shown in FIGS. 14 and 15, an orthogonal projection of the bending display portion 01 of the flexible display panel 2 on the first plane is overlapped with orthogonal projection(s) of the patterned region(s) 03 of the support plate 1 on the first plane. That is, in an unfolded state of the flexible display panel 2, in the thickness direction of the support plate 1, the bending display portion 01 of the flexible display panel 2 faces a part of through holes 10 in at least one patterned region 03 of the support plate 1.

In this way, when the bending display portion 01 of the flexible display panel 2 is bent, the support plate 1 is bent along with the bending display portion 01, and the part of through holes 10 deform along with the bending of the support plate 1, thereby releasing the bending stress, and improving the ability of the support plate 1 to return to be flat after being bent. Therefore, in addition to supporting the flexible display panel 2, the support plate 1 may further improve the flatness of the foldable display after being folded and then unfolded and the ability of returning to be flat after being folded. In addition, the bending ability of the support plate 1 may also improve the bending ability of the flexible display panel 2, so as to improve the folding effects of the foldable display.

In some examples, as shown in FIG. 14, the flexible display panel 2 further includes non-bending display portions 02 located at two sides of the bending display portion 01 in the second direction Y. The support plate 1 has one patterned region 03, and the orthogonal projection of the patterned region 03 on the first plane covers the orthogonal projection of the bending display portion 01 of the flexible display panel 2 on the first plane. That is, in the unfolded state of the flexible display panel 2, a width of the patterned region 03 in the second direction Y is greater than or equal to a width of the bending display portion 01 in the second direction Y. In this way, when the bending display portion 01 of the flexible display panel 2 is folded, the plurality of through holes in the support plate 1 may release the bending stress of any part of the bending display portion 01, and may make any part of the bending display portion 01 return to be flat when the flexible display panel 2 is unfolded again, so as to improve the display effects of the foldable display after being folded and then unfolded. In addition, in a case where the width of the patterned region 03 in the second direction Y is greater than the width of the bending display portion 01 in the second direction Y, a part of through holes 10 in the patterned region 03 may further release bending stresses at boundaries of the bending display portion 01 and the non-bending display portions 02, so as to improve the flatness at the boundaries of the bending display portion 01 and the non-bending display portions 02 when the flexible display panel 2 is folded and improve the ability of returning to be flat.

In some other examples, the support plate 1 has two patterned regions 03, the orthogonal projection of the bending display portion 01 of the flexible display panel 2 on the first plane and the orthogonal projection of each patterned region 03 on the first plane have an overlapped portion. As shown in FIG. 15, the overlapped portions are located at the two sides of the bending display portion 01 proximate to the non-bending display portions 02. In this way, in a case where the flexible display panel 2 is folded with a large bending radius, a middle portion of the bending display portion 01 is approximately not folded. That is, there is almost no stress concentration in the middle portion. Therefore, no through hole 10 is required to release the bending stress.

In some examples, as shown in FIGS. 14 and 15, each through hole 10 extends in the first direction X (i.e., a direction perpendicular to the paper surface) on the first plane, and the bending display portion 01 of the flexible display panel 2 is folded along the bending line parallel to the first direction X. In this way, when the flexible display panel 2 is folded, each through hole 10 deforms in the second direction Y, and the degree of deformation is the greatest, which may release the bending stress to the greatest extent, so as to improve the ability of the flexible display panel 2 to return to be flat after being folded, and improve the display effects of the foldable display after being folded and unfolded.

The foregoing descriptions are merely specific implementations of the present disclosure, but the protection scope of the present disclosure is not limited thereto, and Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A support plate, comprising:
    a support plate body having at least one patterned region; and
    a plurality of through holes disposed in the at least one patterned region and penetrating through the support plate body in a thickness direction of the support plate body, a projection of each through hole on a first plane perpendicular to the thickness direction of the support plate body being strip-shaped;
    each of the plurality of through holes extends in a first direction on the first plane;
    wherein the plurality of through holes are arranged in a plurality of columns of through holes in a second direction, and any two adjacent columns of through holes are spaced apart; each column of through holes includes at least one through hole arranged in the first direction; the second direction is perpendicular to the first direction on the first plane;
    wherein a maximum value $A_{max}$ of lengths of the plurality of through holes in the first direction, a minimum value $C_{min}$ of first distances each between any through hole in a column of through holes and any through hole in an adjacent column of through holes in the second direction, and a bending radius R of the support plate body bending along a bending line parallel to the first direction in the at least one patterned region satisfy a formula:

$$\frac{10^6 \times C_{min}^3}{R \times A_{max}^3} \leq 30 \text{ mm}^{-1};$$

where a length of each through hole in the first direction is a maximum length of the through hole in the first direction, and the maximum value $A_{max}$ is a maximum value of a plurality of maximum lengths; a first distance between any through hole in a column of through holes and any through hole in an adjacent column of through holes in the second direction is a minimum first distance of the two through holes in the second direction, and the minimum value $C_{min}$ is a minimum value of a plurality of minimum first distances; units of the maximum value $A_{max}$, the minimum value $C_{min}$ and the bending radius R are the same;
wherein the minimum value $C_{min}$ and a thickness t of the support plate body satisfy a condition that t:$C_{min}$=1~4;
wherein a maximum value $D_{max}$ of widths of the plurality of through holes in the second direction and the minimum value $C_{min}$ satisfy a condition that $D_{max}$:$C_{min}$=1~5; a width of each through hole in the second direction is a maximum width of the through hole in the second direction, and the maximum value $D_{max}$ is a maximum value of a plurality of maximum widths;
wherein a minimum value $B_{min}$ of second distances each between every two adjacent through holes in a same column of through holes in the first direction and the minimum value $C_{min}$ satisfy a condition that $B_{min}$:$C_{min}$=0.5~4; a second distance between every two adjacent through holes in the first direction is a minimum second distance of the two through holes in the first direction, and the minimum value $B_{min}$ is a minimum value of a plurality of minimum second distances.

2. The support plate according to claim 1, wherein a projection of at least one of the plurality of through holes on the first plane is in a rectangular shape.

3. The support plate according to claim 1, wherein a projection of at least one of the plurality of through holes on the first plane is in a rectangular shape with rounded corners.

4. The support plate according to claim 1, wherein a projection of at least one of the plurality of through holes on the first plane is in a closed shape composed of two straight line portions and two curved line portions; the two straight line portions extend in a first direction, each end of one straight line portion is aligned with one end of another straight line portion in a second direction, and the second direction is perpendicular to the first direction on the first plane; each curved line portion is connected to respective ends of the two straight portions that are aligned with each other.

5. The support plate according to claim 4, wherein each curved line portion is a semicircle.

6. The support plate according to claim 1, wherein each column of through holes includes through holes arranged in the first direction;
    in any two adjacent columns of the plurality of columns of through holes, in addition to two through holes at two ends of one column of through holes, a projection of any through hole of the one column of through holes on a second plane perpendicular to the second direction is overlapped with projections of two adjacent through holes in another column of through holes on the second plane perpendicular to the second direction;

a projection of each of the two through holes at the two ends on the second plane perpendicular to the second direction is overlapped with a projection of one through hole or projections of two adjacent through holes in the another column of through holes on the second plane perpendicular to the second direction.

7. The support plate according to claim 6, wherein a projection of a portion between any two through holes in the one column of through holes on the second plane is located in a middle of a projection of one through hole in the another column of through holes on the second plane.

8. The support plate according to claim 1, wherein the maximum value $A_{max}$ and the minimum value $B_{min}$ satisfy a condition that $A_{max}:B_{min}=10\sim100$.

9. The support plate according to claim 1, wherein first distances each between any through hole in a column of through holes and any through hole in an adjacent column of through holes in the second direction are equal.

10. The support plate according to claim 1, wherein the maximum length of each through hole in the first direction is within a range of 1 mm to 50 mm, and a thickness t of the support plate body is within a range of 0.01 mm to 0.5 mm.

11. A foldable display, comprising:
a flexible display panel having a bending display portion;
the support plate according to claim 1, the support plate being disposed on a side of the flexible display panel opposite to a light exit side of the flexible display panel, an orthogonal projection of the bending display portion of the flexible display panel on the first plane being overlapped with an orthogonal projection of each of the at least one patterned region on the first plane.

12. The foldable display according to claim 11, wherein the at least one patterned region includes one patterned region, and the orthogonal projection of the bending display portion of the flexible display panel on the first plane is located in the orthogonal projection of the patterned region on the first plane.

13. The foldable display according to claim 12, wherein each of the plurality of through holes extends in a first direction on the first plane, and the bending display portion of the flexible display panel is bent along a bending line parallel to the first direction.

\* \* \* \* \*